United States Patent [19]

Bhandarkar et al.

[11] Patent Number: 5,043,867
[45] Date of Patent: Aug. 27, 1991

[54] EXCEPTION REPORTING MECHANISM FOR A VECTOR PROCESSOR

[75] Inventors: Dileep P. Bhandarkar, Shrewsbury; Robert Supnik, Carlisle; Steven Hobbs, Westford, all of Mass.

[73] Assignee: Digital Equipment Corporation, Maynard, Mass.

[21] Appl. No.: 170,393

[22] Filed: Mar. 18, 1988

[51] Int. Cl.⁵ ............................................. G06F 13/00
[52] U.S. Cl. ................................ 364/200; 364/232.21; 364/259; 364/259.9; 364/265; 364/265.4; 364/265.6; 364/262.4
[58] Field of Search ... 364/200 MS File, 900 MS File, 364/730, 736, 748, 749

[56] References Cited

U.S. PATENT DOCUMENTS

| | | | |
|---|---|---|---|
| 4,128,880 | 12/1978 | Cray, Jr. | 364/200 |
| 4,490,786 | 12/1984 | Nakatani | 364/200 |
| 4,617,625 | 10/1986 | Nagashima et al. | 364/200 |
| 4,636,942 | 1/1987 | Chen et al. | 364/200 |
| 4,661,900 | 4/1987 | Chen et al. | 364/200 |
| 4,665,479 | 5/1987 | Oinaga | 364/200 |
| 4,680,730 | 7/1987 | Omoda et al. | 364/900 |
| 4,740,893 | 4/1988 | Buchholz et al. | 364/200 |
| 4,791,555 | 12/1988 | Garcia et al. | 364/200 |
| 4,809,157 | 2/1989 | Eilert et al. | 364/200 |

OTHER PUBLICATIONS

IBM System/370 Vector Operations Manual, First Edition, Publication No. SA22-7125-0, Jan. 1986.
CRAY-2 Computer System Functional Description, Publication No. HR-2000, CRAY Research, Inc., May 1985.

Primary Examiner—Gareth D. Shaw
Assistant Examiner—Rebecca L. Rudolph
Attorney, Agent, or Firm—Finnegan, Henderson, Farabow, Garrett and Dunner

[57] ABSTRACT

A data process system capable of executing vector instructions and scalar instructions detects the occurrence of arithmetic exception conditions and allows subsequent scalar instruction processing until execution of the next vector instruction is required.

27 Claims, 15 Drawing Sheets

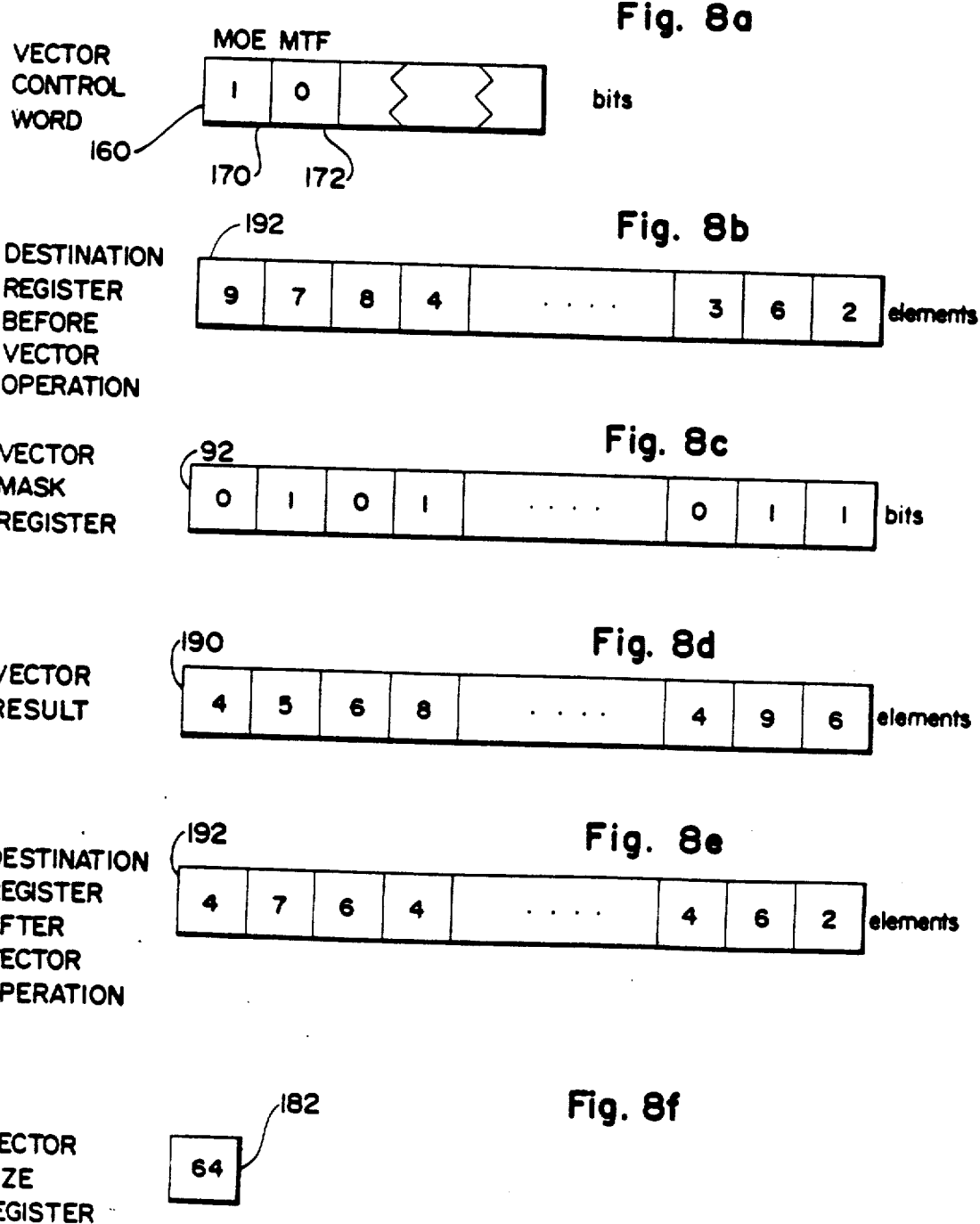

Instruction Preprocessing

CONTEXT SWITCH

INSTRUCTION DECODING

Vector Processor Disabled Fault

EXCEPTION REPORTING MECHANISM FOR A VECTOR PROCESSOR

BACKGROUND OF THE INVENTION

This application is related to U.S. Patent Application No. 170,399, entitled Context Switching Method and Apparatus for Use in a Vector Processing System, by D. Bhandarkar et al.; U.S. Pat. No. 4,949,250, entitled Method and Apparatus for Executing Instructions for a Vector Processing System, by D. Bhandarkar et al.; and U.S. Patent Application No. 170,367, entitled Method and Apparatus for Handling Asynchronous Memory Management Exceptions by a Vector Processor, by F. McKeen et al., which are herein incorporated by reference.

The invention relates to data processing systems with vector processing generally, and specifically to such data processing systems which must react to arithmetic exception conditions during vector processing operations.

Certain high performance data processing systems include, in addition to a main or scalar processor, a separate vector processor to process vector instructions quickly and efficiently. Vector instructions direct a processor to perform memory, arithmetic or logical operations on data represented as vectors. The main or "scalar" processor processes the other instructions, which are often called scalar instructions. For example, scalar instructions direct a processor to perform memory, arithmetic or logical operations on logical and scalar data.

Vector processors are often designed to operate simultaneously with a scalar processor. During such simultaneous processing, problems may occur in the vector processor which may have an unfortunate impact on the scalar processor. For example, arithmetic exceptions, such as arithmetic overflow or underflow, may occur during a vector processor arithmetic operation. Actions taken in response to these exceptions can have a significant impact on the rest of the data processing system. For example, if such actions include interrupting the scalar processor, then the efficiency of the scalar processor declines. If, instead, the system prohibits the processing of subsequent instructions by the scalar and vector processors until the conditions are treated, then the efficiency of the entire system suffers.

In the IBM System/3090 VF, vector instructions are executed sequentially (i.e., one-at-a-time), and any exceptions encountered during execution of the instructions are recognized sequentially. In this system exceptions include exponent overflow, exponent underflow, fixed-point overflow, floating-point divide by zero and an unnormalized operand. When one of these arithmetic exceptions is recognized during the execution of an interruptible vector instruction (i.e., one which consists of multiple units of operation with interruptions being permitted between these units of operation), a nonzero exception-extension code is generated. That code indicates whether the interruption was due to a noninterruptible scalar instruction or an interruptible vector instruction, whether the result, if any, was placed in a scalar or vector register, and the address of the register.

As explained above, generating interrupts for vector processing arithmetic exceptions can cause problems for the operation of the scalar processor. This problem is exacerbated in the multi-tasking environment because the scalar processor might be executing instructions for an operating system function when it is interrupted by the vector processor which encountered an exception while executing an instruction for a user process.

An obvious solution to this problem is to prevent processing of operating system functions until all vector instructions from a user process are complete. This solution, however, reduces the efficiency of the data processing system.

Another solution is to prevent simultaneous processing of vector and scalar instructions. This drastic solution, however, defeats many of the advantages created through the use of a separate vector processor.

Data processing systems that perform multi-tasking (i.e., operate several different tasks or processes) require special handling of vector registers. For example, the IBM 3090 provides multi-tasking and the CPU divides its attention between a plurality of processes. Each process is executed for a short period of time before it is switched out of main memory and another process is brought in. The switching out process is termed a context switch. Every time a process is switched out, the current state or context of the machine is saved and the state of the next process to be switched in is restored. State information includes such elements as flags, status words, scalar registers, and vector registers.

The IBM 3090 uses write flags to avoid switching out every vector register every time a context switch occurs. Whenever a vector register is written to during the execution of a process, a corresponding write flag is set. When the current process is switched out, only the contents of those vector registers that were updated during the execution of the process are saved. This reduces system load by requiring the operating system only to save the contents of registers that have changed since the last save. The reduction in system load is accomplished at the expense of added hardware. Furthermore, the load on the system is still significant, however, because at every context switch the operating system must still save the contents of all vector registers that have changed, and the operating system must still restore the contents of the registers to prepare for the next process.

Since typical vector processors contain 8 to 16 vector registers with 32 to 128 elements per register, the saving of an old state and the restoring of a new state at every context switch creates significant overhead, especially when a large number of processes are sharing the processor, but only a few processes use vector instructions.

SUMMARY OF THE INVENTION

It is, therefore, an object of the present invention to minimize the disruption caused in a data processing system when a vector processor experiences an arithmetic exception.

It is another object of the present invention to permit a scalar processor to continue processing during and after an arithmetic exception in a vector processor, at least until a subsequent vector instruction is to be executed by the vector processor.

It is yet another object of the present invention to provide a vector processor in such a data processing system which can selectively ignore certain vector arithmetic exceptions.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a data processing system capable of processing vector instructions and scalar instructions, the vector instructions involving data processing operations on vector quantities and the scalar instructions involving data processing operations on the non-vector quantities. A scalar processor is provided for executing scalar instructions. A vector processor executes vector instructions simultaneously with the execution of scalar instructions by the scalar processor. The vector processor includes exception logic which comprises exception control means for disabling the vector processor in response to the occurrence of an arithmetic exception. The vector processor also includes disablement indicating means, coupled to the exception logic, for indicating that the vector processor is disabled. A control logic unit is provided in the scalar processor and operates as an instruction decoder to identify and route scalar and vector instructions to the scalar and vector processors, respectively. A controller is coupled to the instruction decoder and, when the vector processor is disabled due to the occurrence of an arithmetic exception, prevents the routing of vector instructions to the vector processor. When an arithmetic exception occurs in the vector processor, the scalar processor continues executing scalar instructions despite the occurrence of the arithmetic exception in the vector processor.

The accompanying drawings, which are incorporated in and constitute a part of this specification, illustrate a preferred embodiment of the invention and, together with the description, serve to explain the principles of the invention.

BRIEF DESCRIPTION OF THE DRAWINGS

FIG. 8 shows the contents of various registers and vector control word fields during the processing of a vector instruction;

DESCRIPTION OF THE PREFERRED EMBODIMENT

Reference will now be made in detail to a presently preferred embodiment of this invention, an example of which is illustrated in the accompanying drawings. Wherever possible, the same reference numbers will be used throughout the drawings to refer to the same or like parts.

A. General System Description

Figure 1:
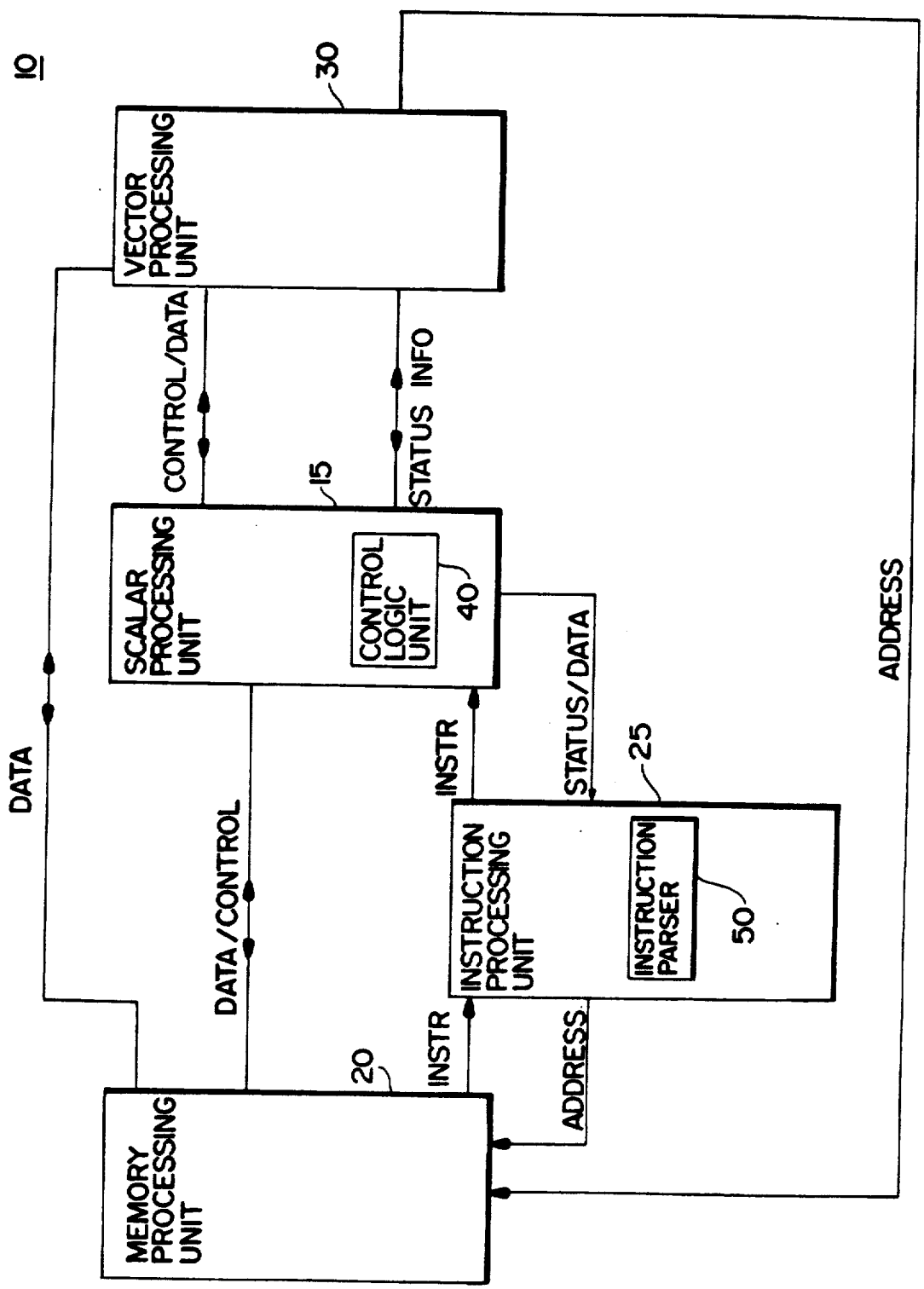
FIG. 1 is a drawing of a preferred embodiment of a data processing system in accordance with the present invention.

In accordance with the present invention, there is provided a data processing system, such as system 10, which is capable of executing vector instructions and scalar instructions. FIG. 1 shows a data processing system 10 comprising various elements such as a scalar processing unit (SPU) 15, a memory processing unit 20, an instruction processing unit (IPU) 25, and a vector processing unit (VPU) 30.

The data processing system of this invention includes scalar processing means for executing scalar instructions. In the preferred embodiment of the invention, SPU 15 receives all the instructions from IPU 25, executes the scalar instructions and sends the vector instructions and vector data received from IPU 25 to VPU 30.

In accordance with the present invention, the data processing system also includes vector processing means for executing vector instructions simultaneously with the execution of scalar instructions by scalar processing means. In the embodiment shown in the figures, VPU 30 executes vector instructions simultaneously with the execution of scalar instructions by SPU 15. VPU 30 also contains several vector registers as explained in detail below.

The data processing system of this invention also includes instruction decoding means for routing vector instructions to the vector processing means and scalar instructions to the scalar processing means. As shown in FIG. 1, IPU 25 includes an instruction parser 50 which preprocesses instructions received from memory processing unit 20 in a manner described below. Parser 50 sends scalar instructions and data to SPU 15 and sends vector instructions and scalar data to VPU 30 via SPU 15. SPU 15 includes a control logic unit 40 which contains microcode to pass on to VPU 30 the vector instructions and data. Of course, parser 50 could also be designed to send the vector instructions directly to VPU 30. VPU 30 receives vector data from and sends addresses and vector data to memory processing unit 20 without requiring use of IPU 25 or SPU 15.

Memory processing unit 20 receives control, address and data signals from IPU 25, SPU 15 and VPU 30, and then arbitrates, processes and responds to those signals. Data processing system 10 can also include other elements to perform different functions, but an understanding of such elements is not needed for an understanding of the present invention.

Figure 2:
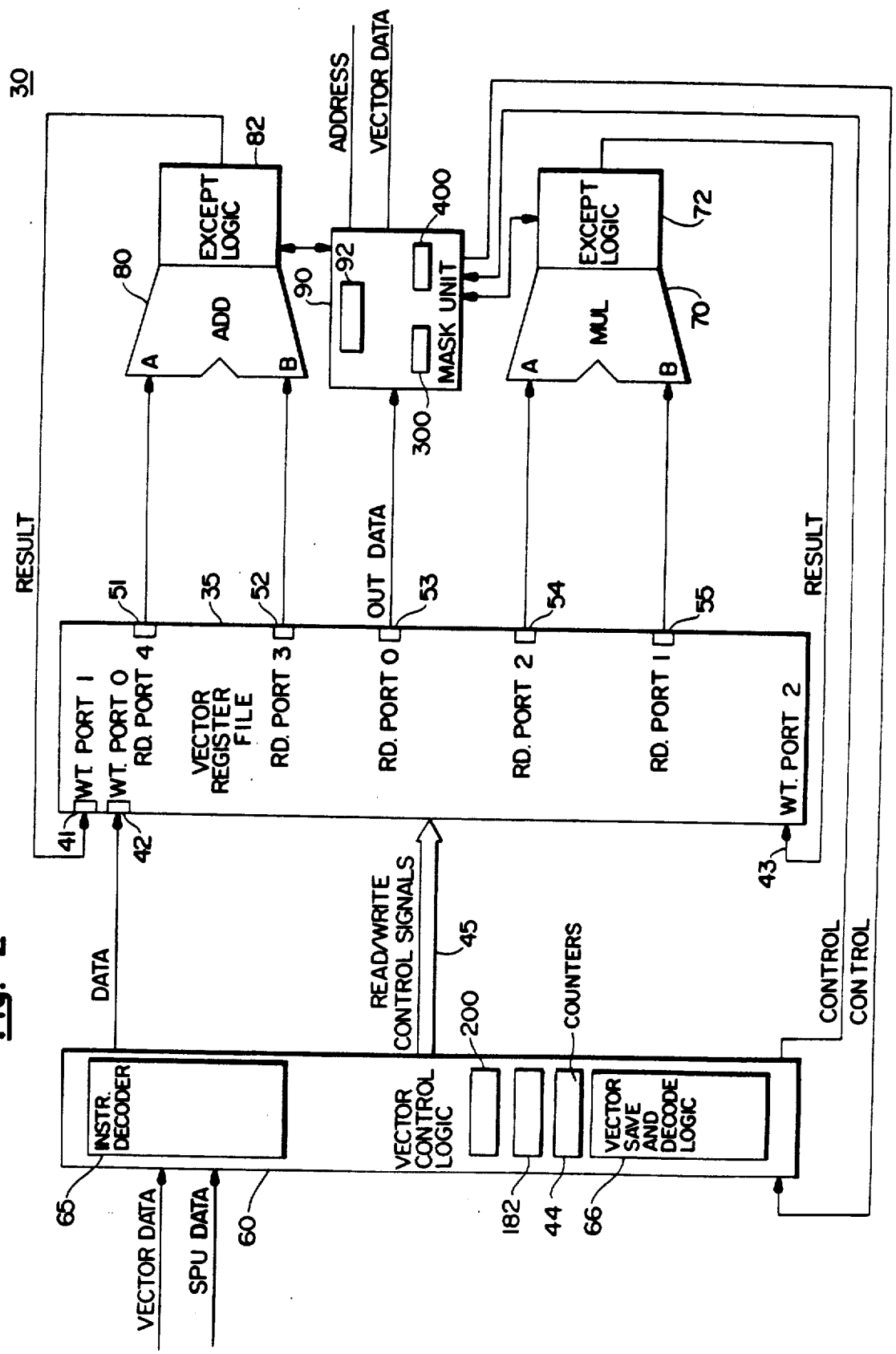
FIG. 2 is a block diagram of certain portions of the preferred embodiment of the vector processing unit shown in FIG. 1.

FIG. 2 is a diagram showing a preferred embodiment of VPU 30. As shown in FIG. 2, VPU 30 includes control logic 60 as the main interface with other portions of data processing system 10 and a vector register file 35 for servicing vector data access requests. Such requests can either be write requests composed of write control signals and write addresses, or read requests composed of read control signals and read addresses. Vector register file 35 contains a plurality of write ports, shown as WT PORT0-WT PORT2 and denoted by the reference numbers 41-43, as well as a plurality of read ports, shown as RD PORT0-RD PORT4 and denoted by the reference numbers 51-55. The write ports receive READ/WRITE control signals 45 and write data from vector control logic 60, from a vector multiplier 70, or from a vector adder 80.

The read ports operate similarly to the write ports. For example, read port 53, corresponding to RD PORT0, receives a read enable signal, a vector register select signal, and vector element address signals from control logic 60 via READ/WRITE control signals line 45. The read data for read port 53 is provided to a mask unit 90.

The other read ports also receive their control and address signals from control logic 60. The outputs from read ports 55 and 54, i.e., RD PORT1 and RD PORT2, respectively, are connected to vector multiplier 70, and the outputs of read ports 52 and 51, RD PORT3 and RD PORT4, respectively, are connected to vector adder 80.

Vector register file 35 includes a plurality of vector registers, preferably sixteen, which store vectors processed by VPU 30. Each vector register preferably has sixty-four elements. The size of file 35, however, is not critical to the present invention.

The number of entries of the vector being processed, i.e., the length of that vector, is stored in a vector length register (VLR) 182 in control logic 60. In the preferred embodiment, a vector can have up to sixty-four entries and, accordingly, vector length register 182 is 7-bits long to represent vector lengths from 0 to 64 entries.

Vector adder 80 performs integer and floating point add and subtract operations on two vectors supplied from the vector register file 35 via RD PORT3 and RD PORT4. Preferably adder 80 also performs certain logical and shift operations. The output of vector adder 80, labeled "RESULT," provides a data input to PORT1. Vector adder 80 also includes exception logic 82 coupled to mask unit 90 which permits adder 80 to perform operations upon condition and to advise mask unit 90 of arithmetic exception conditions.

Vector multiplier 70 performs integer and floating point multiplication and division operations on two vectors received from RD PORT1 and RD PORT2 of vector register file 35. The product or quotient of those inputs is a vector also labeled "RESULT" and is provided as input data to WT PORT2. Exception logic 72, which is coupled to mask unit 90, indicates to mask unit 90 when there is an arithmetic exception condition resulting from the multiplication or division by multiplier 70.

Mask unit 90 receives data from vector register file 35 via RD PORT0 and provides vector data from VPU 30 to SPU 15 via the VECTOR DATA line shown in FIG. 2. Mask unit 90 also can read the data from RD PORT0 and convert it to an address for the memory processing unit 20. In addition, mask unit 90 is coupled to exception logic 72 and 82 and latches their exception conditions.

Contained in mask unit 90 is a 64 bit vector mask register 92. Each bit in register 92 corresponds to a different one of the 64 vector elements in a given vector register and indicates whether the corresponding vector element is enabled and should be processed. Mask register 92 can be loaded with data from SPU 15, via control logic 60. Preferably, vector mask register 92 ensures that only the results from the enabled elements in a vector register will be stored.

Vector control logic 60 preferably includes an instruction parser 65 and vector save and decode logic 66 to implement certain control functions. Vector save and decode logic 66 in control logic 60 oversees the scheduling of all activity in VPU 30 and performs certain data transfer activity.

Figure 3:
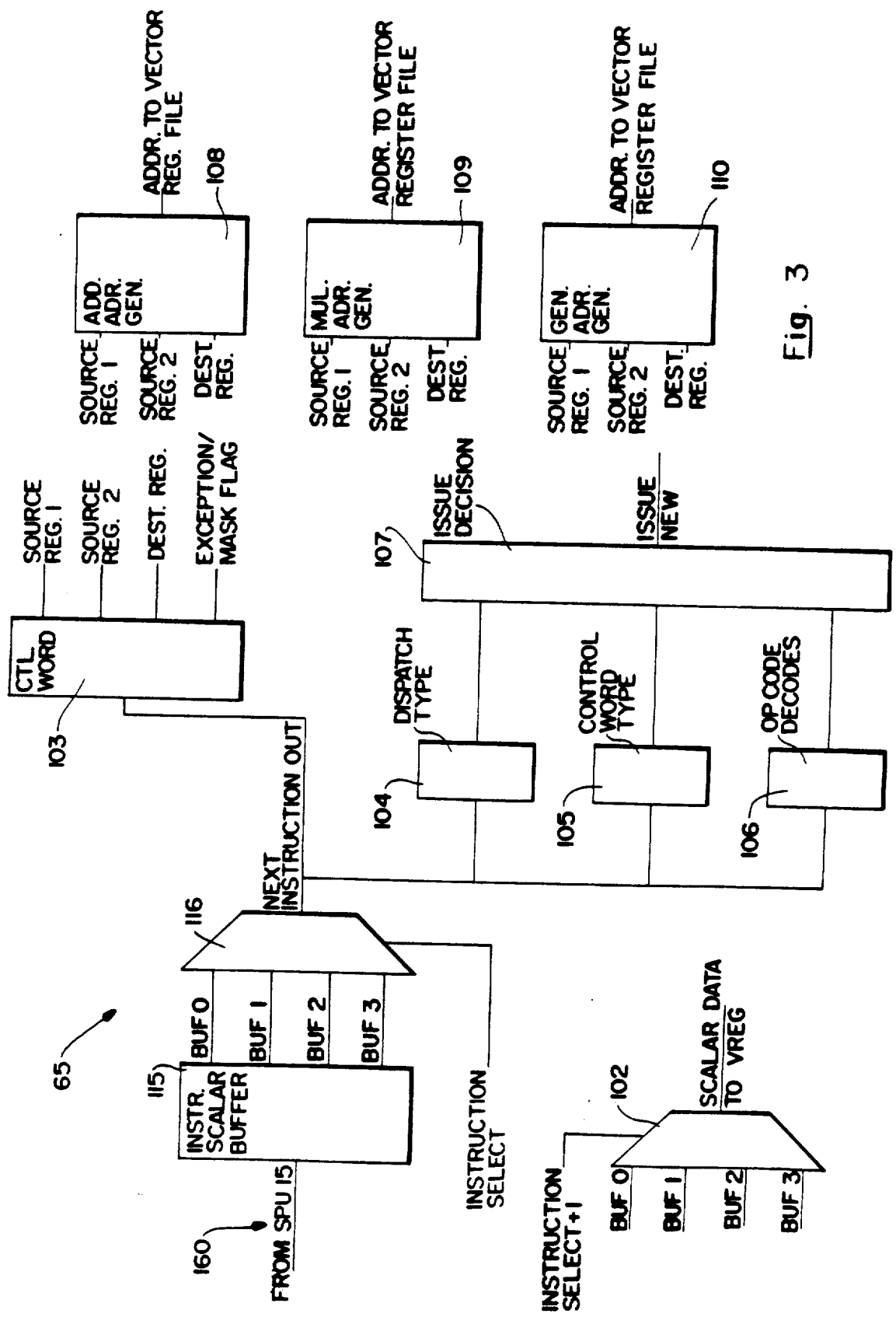
FIG. 3 is a block diagram of certain portions of the preferred embodiment of the vector control logic shown in FIG. 2.
Figure 4A:
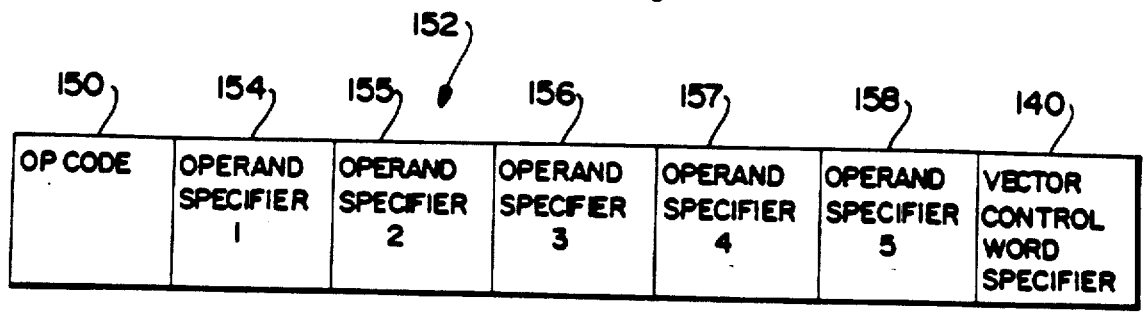
FIG. 4 shows various formats for vector instruction words which can be used in a data processing system shown in FIG. 1.
Figure 4B:
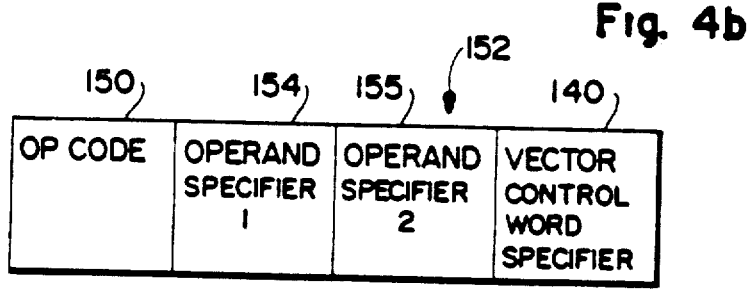
Figure 4C:
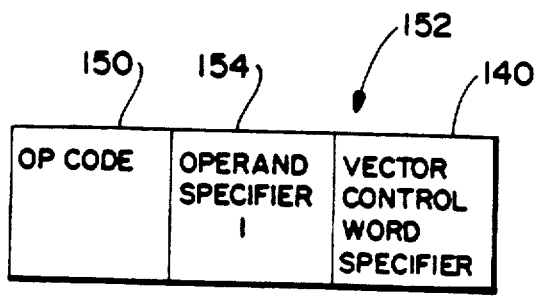
Figure 4D:
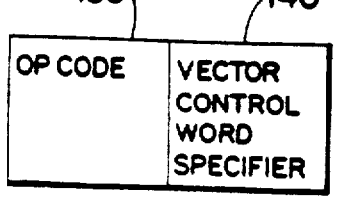

Instruction parser 65, portions of which are shown in greater detail in FIG. 3, receives information (i.e., instructions via the VECTOR DATA line) from SPU 15 and directs incoming data and addresses to the appropriate read and write ports and then to a vector multiplier 70, vector adder 80, or mask unit 90. Preferably, instruction parser 65 passes scalar data received from SPU 15 on a SCALAR DATA line to be stored, preferably, in scalar registers (not shown) in vector register file 35 for use during vector processing operations.

FIG. 3 shows the internal logic of instruction parser 65 in VPU 30. Parser 65 receives from SPU 15, as inputs 100, partially decoded vector instruction information and scalar data. These inputs are stored in instruction buffer 115 which holds the instructions and the data in the proper order until the vector instructions can be executed by VPU 30.

Multiplexer 116, which is connected to the outputs BUF0-BUF3 of buffer 115, then correctly outputs the instruction information for the next instruction to be decoded. That information is determined by the Instruction Select signal which is a two-bit recirculating counting signal that makes buffer 115 appear to operate as a circulating buffer.

Scalar data is selected by multiplexer 102, which is also connected to receive the BUF0-BUF3 outputs from buffer 115, according to the Instruction Select + 1 signal, which has a value of 1 larger than the Instruction Select signal. The scalar data is driven to vector register file 35, when it is stored in a scalar register corresponding to either vector adder 80, vector multiplier 70 or mask unit 90.

If the vector instruction being decoded requires only vector operands, then the information is passed through buffer 116 and the operands are determined according to control word decoder element 103 in a manner described below. If an instruction requires scalar data, however, that data is passed from SPU 15 following the instruction, and is output at the correct time by multiplexer 102.

After the instruction is selected by multiplexer 116, certain fields are distributed to decode logic elements 103, 104, 105 and 106. The instruction information in the partially decoded instruction includes an opcode portion indicating the type of instruction, a control word type portion indicating the type of the control word (described below in greater detail), a dispatch type portion indicating which of the main vector units, such as adder 80 or multiplier 70, is to be used by the instruction, and a control word portion specifying the operands and flags for the vector instruction.

Control word decoder element 103 strips the operands from the control word portion to form the addresses for the registers in the vector register file 35 both for the vector registers which provide the source of data for the specified vector operations, i.e., SOURCE REG1 and SOURCE REG2, and the vector register which stores the result of the vector operation, i.e., DEST REG. In addition, the decoder element 103 also strips out the Exceptions/Mask flags.

The values for SOURCE REG 1, SOURCE REG 2, and DEST REG are inputs to address generators 108, 109, and 110, respectively, which generate addresses for the vector adder 80, the vector multiplier 70, and mask unit 90, respectively, according to the type of instructions. Preferably, address generators 108, 109 and 110 are counters which determine the particular suboperation being performed and ar shown as counters 44 in vector control logic 60 (FIG. 2).

The other instruction type portions are sent to dispatch type logic 104, control word type logic 105, or the opcode decode logic 106 for further decoding. Based on such decoding, issue decision logic 107 then determines whether that instruction can issue. For example, if vector adder 80 is busy, then the next instruction must be delayed if it requires adder 80 until adder 80 is free. When the issue decision logic 107 determines that the next instruction can execute, it issues an Issue New signal which causes address generators 108, 109, and 110 to load their proper value.

B. Vector Instruction Format

FIG. 4 shows the formats of various vector instruction words having different numbers of operand specifiers. FIG. 5 shows different formats of a vector control word pointed to by a vector control word specifier 140 of a vector instruction word having the format shown in lines (a)-(d) of FIG. 4.

As shown in FIG. 4 of the present embodiment, vector instructions contain opcode field 150, which holds an operation code identifying the type of instruction, and an operand pointer section 152. Operand pointer section 152 may contain any number of operand specifiers 154-158 and a vector control word specifier 140. Preferably, all operand specifiers in the operand pointer section 152 have the same format as the operand specifiers in a scalar instruction and, like the specifiers in the scalar instruction, the operand specifiers in the vector instruction words identify the location of a scalar operand. Because the vector operand specifiers and scalar operand specifiers (see FIG. 7) have identical formats, operands may be fetched before knowing whether a given instruction is a vector instruction or a scalar instruction.

Figure 7:
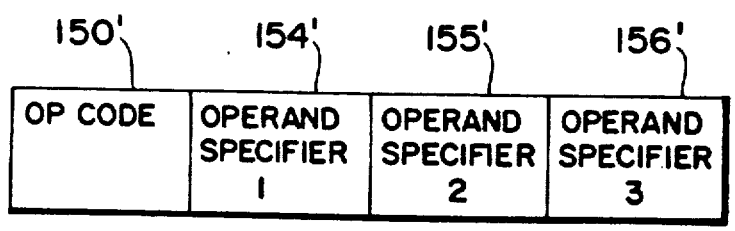
FIG. 7 shows one format for a scalar instruction word which can be used in a data processing system according to the present invention.

FIG. 7 shows a scalar instruction word having three operand specifiers 154', 155', and 156'. Vector control word specifier 140 in lines (a) through (d) of FIG. 4 and vector operand specifiers 154', 155', and 156' of FIG. 7 use identical address schemes, thus freeing instruction parser 50 from having to fetch operands differently for vector instructions and scalar instructions. Use of an identical address scheme allows the organization of VPU 30 to be transparent to IPU 25. The preferred addressing scheme by which operand specifiers 154-158 identify operands is explained in U.S. Pat. No. 4,241,399 issued to Strecker et al., which is herein incorporated by reference.

Figure 5A:
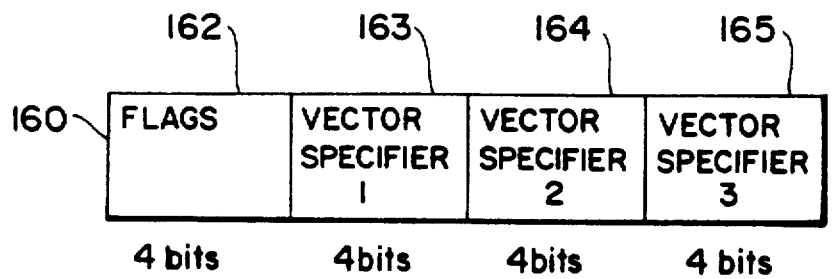
FIG. 5 shows a vector control word associated with the vector instruction words shown in FIG. 4.

Unlike the operand specifiers 154-158, vector control word specifier 140 points to a 16 bit vector control word 160, three examples of which are shown in FIG. 5. Vector control word 160, as shown in FIG. 5, contains 16 bits, but could be any length, such as 8, 32 or 64 bits. In FIG. 5(a), vector control word 160 is divided into four 4-bit fields 162-165. Preferably, field 162 is a flags field and either one, two or three of the fields 163-165 are vector register specifier fields which contain pointers to, or are specifiers of, vector register operands to be accessed during execution of vector instructions. Each vector register specifier preferably identifies a unique vector register. The four bits of each vector register specifier field can uniquely identify one of the sixteen vector registers contained in the current embodiment of the invention.

Figure 5B:
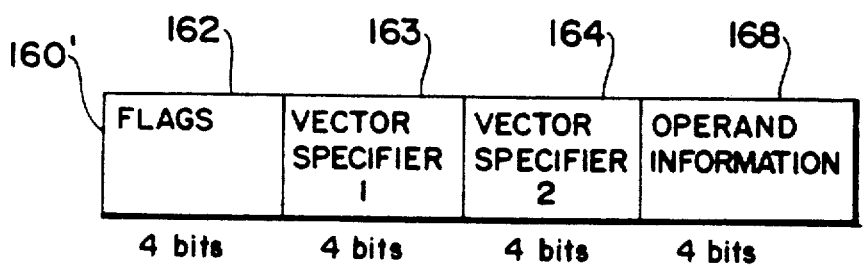

FIG. 5(b) shows an alternate format for a vector control word 160'. In addition to flags field 162 and vector specifier fields 163 and 164, control word 160' includes a 4-bit operand information field 168 instead of the 4-bit vector register specifier field 165 of FIG. 5(a). Operand information field 168 contains information required for various vector operations. For instance, if the operation code in opcode field 150 indicates that a compare operation is to be performed, the operand information field 168 may contain data specifying whether a "greater than" or "less than" comparison is to be performed. The operand information field 168 may also occur in place of vector register specifier 163, vector register specifier 164, or vector register specifier 165, depending on the value of the opcode field 150.

Figure 5C:
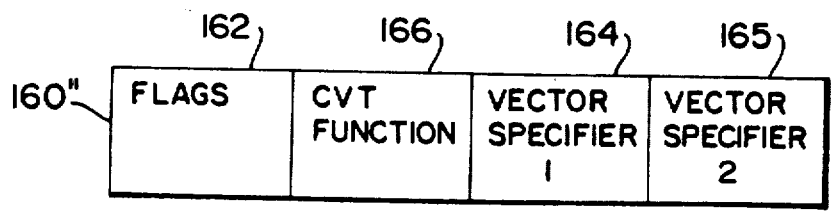

FIG. 5(c) shows yet another format for a vector control word 160". Control word 160" contains a convert field 166 in place of the vector specifier field 163. Convert field 166 identifies a conversion function to be performed so that values in the vector register specified by field 164 are properly converted before storage in the vector register specified in field 165. Such conversion can include, for example, a floating point to integer or long word conversion, etc.

Figure 6:
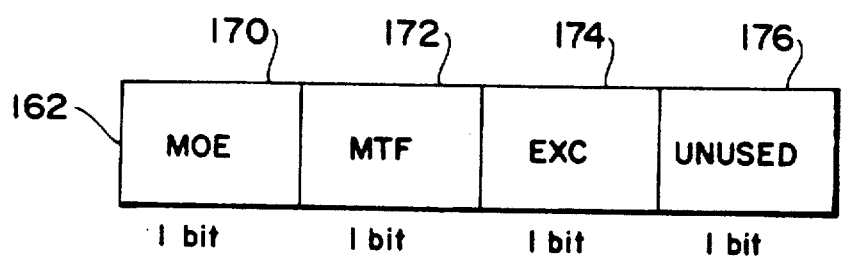
FIG. 6 shows the FLAGS field of the vector control word shown in FIG. 4.

FIG. 6 shows an expansion of the flags field 162 of the vector control word 160 of FIG. 5(a). One bit contains a mask operation enable (MOE) flag 170. A second bit contains a match true/false (MTF) flag 172. MTF flag 172 determines whether a Boolean value of zero or one represents an enabled bit in vector mask register 92. A third bit contains the exception enable (EXC) flag 174 which enables exception handling when vector processing exceptions occur. A fourth flag bit 176 is presently unused. The use of these bits is dependent on the instruction being processed at the time.

As explained briefly above, in the masking function enabled by MOE flag 170, only those results of a vector operation corresponding to an enabled bit in vector mask register 92 are stored after an operation. FIG. 8 shows an example of how the vector mask register 92, the vector length register 182, and the MOE and MTF flags 170 and 172, respectively, of the flags field of vector control word 160 affect the storage of a result of a vector operation. In FIG. 8(a), the MOE flag 170 of the vector control word contains a value of "1", indicating that masking is enabled. The MTF flag 172 contains a value of "0," indicating that only those results corresponding to values of "0" in the vector mask register 92 are to be stored.

FIG. 8(b) shows the contents of a destination register 192 of vector register file 35 before a vector operation has occurred, that is, before result data from a vector operation has been stored in the destination register 192. FIG. 8(c) shows vector mask register 92 in which bits set to "0" are enabled bits because of the MTF field 172 in FIG. 8(a).

FIG. 8(d) shows a result 190 of a vector operation before masking and before the vector result 190 has been stored in destination register 192 (the values in result 190 have been chosen arbitrarily for the sake of example). Note that, in FIG. 8b, the two leftmost elements of the destination register 192 contain values of "9" and "7," respectively. After the vector operation, the two leftmost elements of the vector result 190 contain values of "4" and "5," respectively, as shown in FIG. 8(d). The leftmost element of the vector result 190 corresponds to a bit in the vector mask register 92 having a value of "0." The second leftmost bit in the vector result 190 corresponds to a bit in vector mask register 92 having a value of "1."

FIG. 8(e) shows destination register 192 after masking, when certain elements of vector result 190 of FIG. 8(d) have destination register 192 contains the value "4." This value was stored into destination register 192 because a corresponding bit in the vector mask register 92 contained a value of "0." The second leftmost element of destination register 192, however, still retains its original value of "7" in FIG. 8(e). The result value of "5" in vector result 190 in FIG. 8(d) was not stored into destination register 192 in FIG. 8(e) because a corresponding bit in the vector mask register 92 contained a "1." Similarly, all other elements of vector result 190 which correspond to enabled bits of the vector mask register 92 are stored in destination register 192, but no element of the vector result 190 corresponding to a disabled vector mask register bit is stored in destination register 192.

C. Instruction Preprocessing

Figure 9:
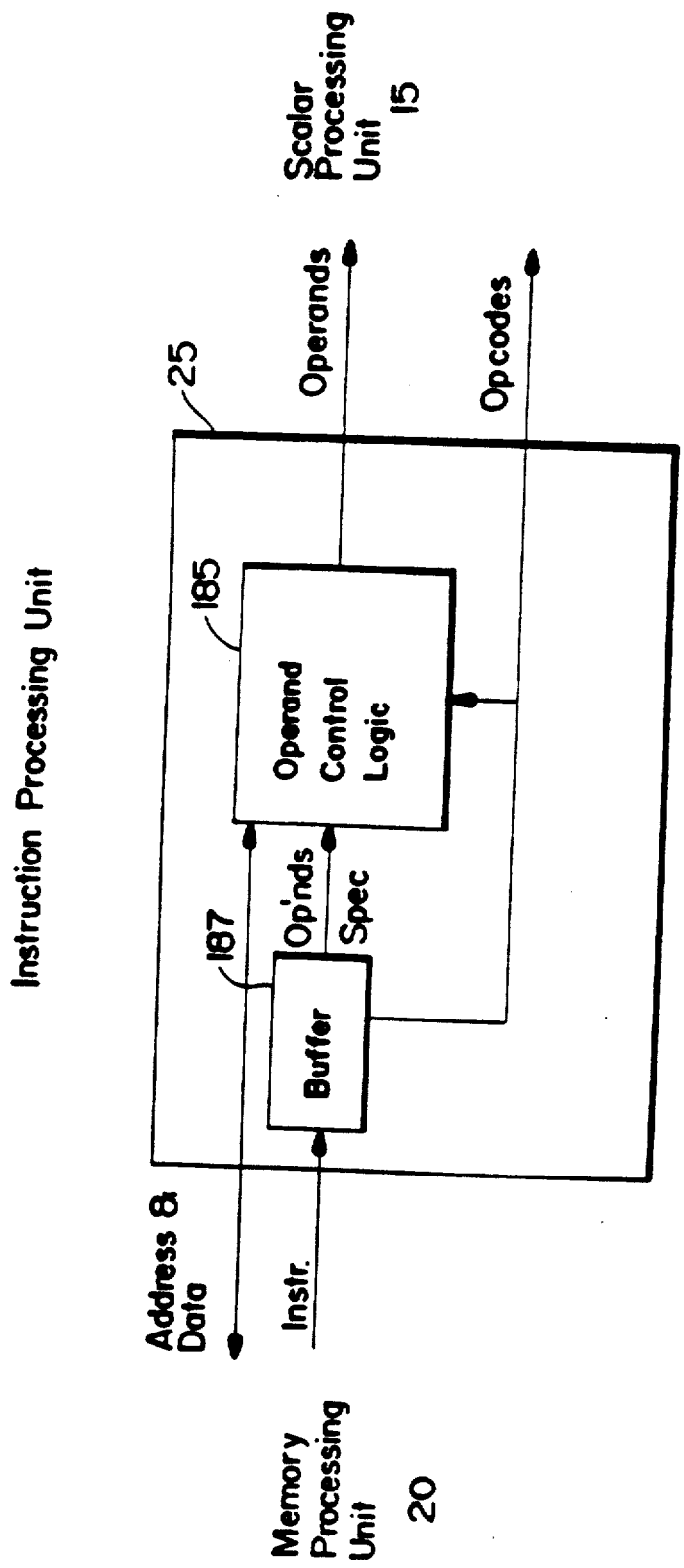
FIG. 9 shows a preferred embodiment of an instruction decoder.

Prior to SPU 15's routing of instructions either to VPU 30 or to other circuitry in SPU 15 for execution, IPU 25 performs certain preprocessing on the instructions. As explained briefly above, the unique nature of the instruction formats discussed above allows IPU 25 to use the same circuitry, a preferred embodiment of which is shown in FIG. 9 as including buffer 187 and operand control logic 185, to preprocess both vector instructions and scalar instructions identically.

Figure 10:
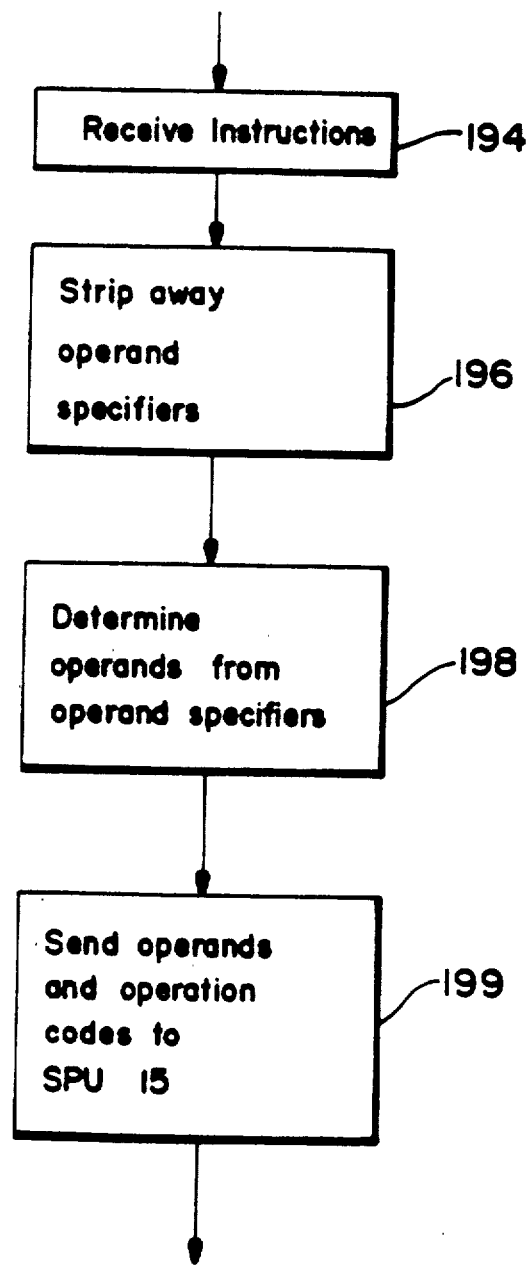
FIG. 10 is a flowchart of the operations performed when decoding a vector instruction.

FIG. 10 is a flow chart of a preferred procedure for preprocessing instructions in IPU 25. When memory processing unit 20 transmits an instruction to IPU 25, that instruction is input to buffer 187 (step 194 in FIG. 10). The operation code portion of that instruction (i.e., opcode field 150 shown in FIGS. 4(a)-(d)) is then stripped away (step 196), and transmitted to SPU 15. The operand pointer portion of that instruction (i.e.. operand pointer section 152 in FIGS. 4(a)-(d)) becomes an input to operand control logic 185, which also has access to the operation code portion if needed to perform its functions.

Operand control logic 185 decodes the operand specifier portions, using the operation codes if necessary, and performs any accesses to memory processing unit 20 necessary to determine the operands pointed to by each operand specifier portion (step 198). The details of the procedure to determine operands are explained in the Strecker et al. patent referred to above. Finally, IPU 25 sends the operands and the operation code portions to SPU 15 either for execution by SPU 15 or for transmission to VPU 30 of vector instructions and operands (step 199).

Because the vector and scalar processing instructions have the same format, operand control logic 185 performs the same function for both vector and scalar instructions. Indeed, for any type of data processing means that has a separately operating processor, such as an FFT processor or a floating point processor, the use of the instruction formats described above allows a single instruction processor, such as IPU 25 to preprocess all instructions in the same manner.

D. Vector Processing Exceptions

1. Vector Processor Registers

Figure 11:
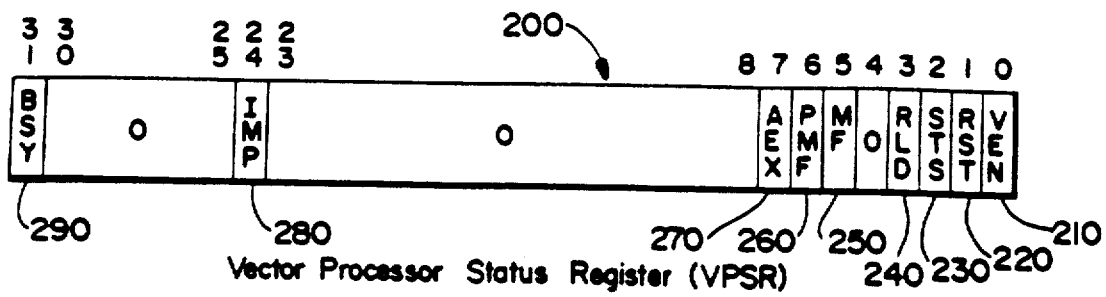
FIG. 11 is a diagram of a vector processor status register for the vector processing unit shown in FIGS. 1 and 2.
Figure 12:
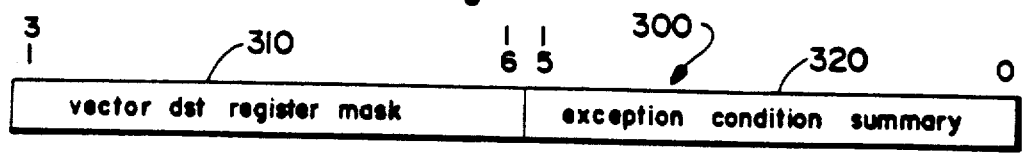
FIG. 12 is a diagram of a vector arithmetic exception register for the vector processing unit shown in FIGS. 1 and 2.
Figure 13:
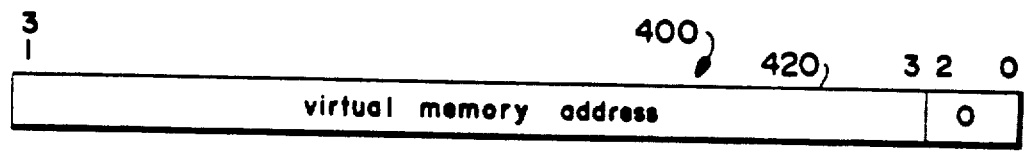
FIG. 13 is a diagram of a vector state address register for the vector processing unit shown in FIGS. 1 and 2.

In accordance with the present invention, the vector processing means includes state means for holding vector state information representing an execution state of the vector processing means. In the preferred embodiment of this invention, a vector processor status register (VPSR) 200, shown in FIG. 11, is provided in VPU 30 to hold information representing VPU 30's execution state. VPSR 200 holds 32 bits of status information about VPU 30 and is preferably located in control unit 60 although it could be located elsewhere. Also located in mask unit 90 are a vector arithmetic exception register (VAER) 300, shown in FIG. 12, and a vector state address register (VSAR) 400, shown in FIG. 13. The contents of registers 200, 300 and 400, as well as other data discussed below, are part of the state information of VPU 30.

Bit zero of VPSR 200 is a vector processor enable (VEN) bit 210 which indicates whether VPU 30 is disabled. VPU 30 is enabled by writing a 1 to this bit and disabled by writing a 0 to this bit. When VPU 30 is disabled, any attempt by SPU 15 to send vector instructions to VPU 30 results in a Vector Processor Disabled Fault.

Bit one of VPSR 200 is a vector processor state reset (RST) bit 220. Writing a one to this bit clears VPSR 200, except for VEN bit 210.

Bit two of VPSR 200 is a vector state store (STS) bit 230 which, if set to a one, initiates the storing of implementation specific vector state information to memory processing unit 20 using a virtual memory address 420 in VSAR 400 for asynchronous handling of memory management exceptions. If synchronous handling of exceptions is implemented, STS bit 230 is ignored. The preferred embodiment of the invention allows the selection of one of two ways of executing vector processing memory access instructions. The two ways result in two different mechanisms for handling memory management exceptions, as explained in the next section. One is synchronous memory management execution and the other is asynchronous memory management execution. During synchronous execution, VPU 30 and SPU 15 process no new instructions until the vector memory access instruction currently executing is guaranteed to complete.

For asynchronous execution, VPU 30 can execute a vector memory access instruction simultaneously either with SPU instruction execution or with VPU execution of other vector memory instructions. Asynchronous memory management allows chained execution of an instruction sequence such as LOAD/ADD/MULTIPLY/STORE.

Bit three of VPSR 200 is a vector state reload (RLD) bit 240 which, if set to a one, initiates reloading of implementation-specific vector state information from memory using virtual memory address 420 in VSAR 400 for asynchronous handling of memory management exceptions. As with STS bit 230, if synchronous handling of exceptions is implemented, RLD bit 240 is ignored.

Bit five of VPSR 200 is a memory fault (MF) bit 250 which is set to a one by VPU 30 to indicate the presence of a memory reference to be re-executed due to an asynchronous memory management exception. This is explained in greater detail below. If synchronous handling of memory management exceptions is implemented, this bit is set to zero.

Bit six of VPSR 200 is a pending memory fault (PMF) bit 260. VPU 30 sets PMF bit 260 to a one to indicate that an asynchronous memory management exception is pending. If synchronous handling of memory management exceptions is implemented, this bit is always zero.

Bit seven of VPSR 200 is an arithmetic exception (AEX) bit 270 which is normally zero to indicate that VPU 30 is not disabled by certain arithmetic exceptions, such as a floating underflow or integer overflow. VPU 30 always sets this bit when an arithmetic exception occurs. Information regarding the specific nature of the exception is located in VAER 300.

Bit twenty-four of VPSR 200 is an implementation-specific hardware error (IMP) bit 280. IMP bit 280 is set to one when VPU 30 is disabled due to a hardware error.

Bit thirty-one of VPSR 200 is a vector processor busy (BSY) bit 290 which VPU 30 sets to one when it is executing vector instructions. When this bit is cleared to zero, the VPU 30 is idle or has suspended instruction execution due to an asynchronous memory management exception.

Preferably VAER 300 is a register used to record information regarding vector arithmetic exceptions. VAER 300 is located in mask unit 90 and is written to by exception units 82 and 72. Control logic unit 40 of the SPU 15 can read the contents of VAER 300 but cannot write to VAER 300. VAER 300 includes two fields in the preferred embodiment: a vector destination register mask 310 and an exception condition summary 320. Vector destination register mask field 310 of VAER 300 records which vector registers have received a default value due to arithmetic exceptions. If the nth one of the sixteen vector registers receives a default value as a result of an arithmetic exception, a one is written to bit n of mask field 310 (bit (16+n) of VAER 300).

Exception condition summary field 320 indicates the type of exception which has occurred. Preferably those conditions include floating underflow, floating divide by zero, floating reserved operand, floating overflow or integer overflow exception conditions.

As explained above, instruction parser 50 in IPU 25 passes vector and scalar instructions to SPU 15. SPU 15 then identifies vector instructions and passes them to VPU 30. Of course, the vector instructions could as well be passed directly to VPU 30 from IPU 25. VPU 30 then executes the vector instructions in accordance with its normal operation. During execution of the vector instructions, however, two types of vector processor exceptions may occur: vector memory management exceptions and vector arithmetic exceptions.

2. Memory Management Exceptions

The two types of vector processor exceptions are handled slightly differently. Unlike vector arithmetic exceptions, vector memory management exceptions do not disable VPU 30. Memory management exceptions which occur during a memory access instruction prevent further processing of that instruction, which is not the case with arithmetic exceptions. Memory management exceptions will also halt the execution of all other instructions which depend on the data.

The vector processing means of this invention includes exception detecting means for indicating the presence of a memory management exception. In the preferred embodiment of VPU 30, control logic 66 is notified by memory processing unit 20 when a memory management exception occurs. The details of this procedure are explained below.

Vector memory management exceptions include access control violations, translation not valid exceptions, modify exceptions and vector alignment exceptions. Preferably, memory processing unit 20 provides signals identifying the type of memory management exception, although such signals could as well be in SPU 15 or VPU 30. These exception identifying signals are part of the state information of VPU 30.

Access control violations involve attempts by VPU 30 to access protected portions of memory or portions of memory outside of the memory space allocated to the current vector process. The current vector process refers to the process containing the vector instruction whose execution caused the memory management exception. A translation not valid exception occurs when there is a page fault or some other attempt to access a portion of memory not currently in memory processing unit 20. A modify exception occurs when the access to a page in memory involves a modification to a page being made for the first time by the current vector process. Vector alignment exceptions occur when long words (which occupy four bytes) or quadwords (which occupy eight bytes) do not fall in long word or quadword boundaries, respectively, in memory processing unit 20. A vector alignment exception is also considered an access control violation because similar software handles both conditions.

If more than one kind of memory management exception occurs during the processing of a single vector instruction, then a certain hierarchy of exception handling must be followed. The highest priority goes to access control exceptions (and accordingly to vector alignment exceptions which are treated similarly) because they are the most serious. Such exceptions cause data processing system 10 to remove the current vector process from execution. The translation not valid exception has the next highest priority.

The vector processing means of the present invention also includes vector halt means for stopping execution of the faulting vector processing instruction by the vector processing means when a memory management exception occurs and for allowing the scalar processing means to continue executing scalar instructions. When a memory management exception occurs, vector state and decode logic 66 causes VPU 30 to discontinue executing vector instructions. This is done by stopping the transmission of valid data to VPU 30.

In accordance with the present invention, the data processing system includes exception record means for recording an indication of the occurrence of a memory management exception and sufficient information about the state of the vector processing means so that the vector processing means can later resume execution at the suboperation of the vector processing instruction during which the memory management exception occurred. In the preferred embodiment of this invention, during both synchronous memory management and asynchronous memory management, the occurrence of a memory management exception causes SPU 15, and in particular control logic unit 40 in SPU 15, to create a memory management stack frame which it stores at a predetermined location in memory processing unit 20. The software for handling the memory management exception is designed to recognize the predetermined location containing the memory management stack frame so appropriate processing, which can include well-known routines appropriate to the specific exception, can proceed expeditiously.

Figure 14:
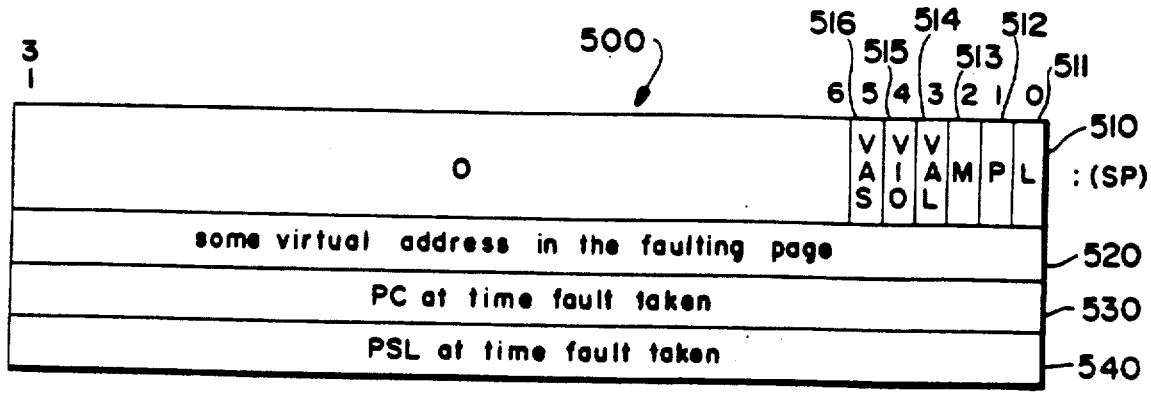
FIG. 14 is a diagram of a memory management fault stack frame generated by the vector processing unit shown in FIGS. 1 and 2.

FIG. 14 illustrates an example of a memory management stack frame 500. Stack frame 500 contains a memory management fault code 510, an address word 520, a program counter PC 530 and a program status word PSL 540.

Fault code 510 preferably contains a length bit 511, a page table reference bit 512, a modify bit 513, a vector alignment bit 514, a vector I/O bit 515, and a vector asynchronous memory management exception bit 516. Length bit 511 is set when there is an access control violation caused by an access to a location in memory processing unit 20 outside of the memory space allocated to the vector process using VPU 30. Page table reference bit 512 is set if a memory management exception occurred while accessing a page table. Modify bit 513 is set if the instruction causing the exception is a write to memory processing unit 20. Vector alignment (VAL) bit 514 is set when the exception is due to the misalignment of a vector element. Vector I/O (VIO) bit 515 is set when an access control violation occurs during a vector instruction reference to an address in I/O space. Vector asynchronous memory management (VAS) bit 516 is set when a vector processor memory management exception occurs while asynchronous memory management is implemented.

During synchronous memory management, exceptions are handled immediately and execution of the faulting instruction is then restarted. The instruction is restarted by backing the vector memory access instruction up to the beginning. At that point, a memory management fault is initiated and the value in PC 530 identifies the faulting vector memory access instruction. VSAR 400 is ignored during synchronous memory management exceptions because memory management exceptions are handled when they occur, so there is no need to store VPU 30 state information.

Address 520 in stack frame 500 represents a virtual address in the page in memory processing unit 20 where the exception occurred. PC 530 is the program counter of the instruction which triggered the exception. Note that the instruction triggering the exception is different from the instruction performing the vector memory access in the case of asynchronous memory management. PSL 540 is a program status word for SPU 15.

As explained above, during asynchronous memory management, not only is SPU 15 allowed to execute scalar instructions simultaneously with VPU 30, but VPU 30 can be executing vector arithmetic instructions along with a vector memory access instruction. If a memory management exception occurs in implementations using asynchronous memory management, then VPU 30 takes steps to freeze its state so that state can be stored and later recalled in order to resume processing at the point where the exception occurred.

Specifically, when VPU 30 executes a vector memory access instruction, decode and control logic 66 actually executes several suboperations necessary to implement such an instruction. For example, for a vector load operation, decode and control logic 66 executes, for each vector element from 0th element to the nth element (n = the contents of VLR 82 - 1), the following suboperations:

1. implement any mask functions;
2. check vector alignment; and
3. load the corresponding vector element with the contents at the next location of memory processing unit 20, beginning with an address generated from an operand of the vector memory access instruction.

Associated with each vector register involved in executing a vector instruction is one of several counters 44 in vector register control logic 60 which counts down from n to 0 as the suboperations are being performed, and which provides an address for the associated vector elements in the associated vector register. If a vector instruction is stopped due to a memory management exception, the value of one of the counters 44 associated with the faulting instruction indicates the suboperation at which the exception occurred. That value, as well as the counter associated with any other unfinished instruction, is preferably stored as part of VPU 30 state information. When VPU 30 is reloaded with the stored state information, and the memory management fault is called, counters 44 are reloaded with the suboperation values so the execution of the faulting instruction and all unfinished instructions can begin where the exception occurred. This hardware is shown in greater detail in U.S.S.N. 093,499, which is herein incorporated by reference.

If, during the processing of a vector memory access instruction, memory processing unit 20 notifies vector decode and control logic 66 of a memory management exception, logic 66 then sets PMF bit 260 and MF bit 250 of VPSR 200. VPU 30, however, does not inform SPU 15 of the exception condition, thus allowing SPU 15 to continue processing scalar instructions.

In addition, logic 66 allows VPU 30 to finish executing any vector instructions that had started when the exception occurred, so long as those vector instructions do not use source data whose validity might be affected by the exception condition. This is done by examining the source and destination registers. As explained above with regard to FIG. 3, address generators 108, 109, 110 identify the vector registers in vector register file 35 containing the data for the vector instruction. These same address generators also identify the vector register receiving the results of the vector instructions. If logic 66 determines that the DEST REG values for a faulting instruction are the same as the SOURCE REG values for another instruction, that other instruction is also halted.

The memory management exception is not handled further until the next time SPU 15 attempts to send a vector instruction to VPU 30. At that time, SPU 15 begins executing a procedure to send the vector instruction to VPU 30, the preferred method of which is shown by the flowchart in FIG. 15.

Before sending a vector instruction to VPU 30, SPU 15 first checks VEN bit 210 to see whether VPU 30 is disabled (step 700). SPU 15 thus acts as an instruction blocking means according to the present invention for preventing the routing of vector instructions to VPU 30 when VEN bit 210 indicates VPU 30 is disabled. If so, SPU 15 concludes that something other than a memory management exception has occurred (at least in the preferred embodiment), and takes a trap for a Vector Processor Disabled Fault (710). The routine for handling this fault is discussed in the following description of arithmetic handling exceptions. Means for sensing when VPU 30 is disabled and for setting the trap are contained in different circuitry or portions of microcode in control logic unit 40 of SPU 15.

If VPU 30 is not disabled, SPU 15 then checks PMF bit 260 (step 720). If PMF bit 260 is set, there has been an unreported memory management exception. SPU 15 resets that bit (step 730) and enters a memory management fault handler to process the vector processor memory management exception (step 735). That fault handler is a standard memory management fault handler well-known to persons of ordinary skill.

If PMF 260 was not set (step 720), SPU 15 next checks MF bit 250 (step 740). If MF bit 250 is set, indicating that the cause for the memory exception has been corrected but the suboperation causing the exception has not yet been executed, SPU 15 clears the MF bit (step 743), and restarts VPU 30 to retry the faulting memory reference again (step 746).

Figure 15:
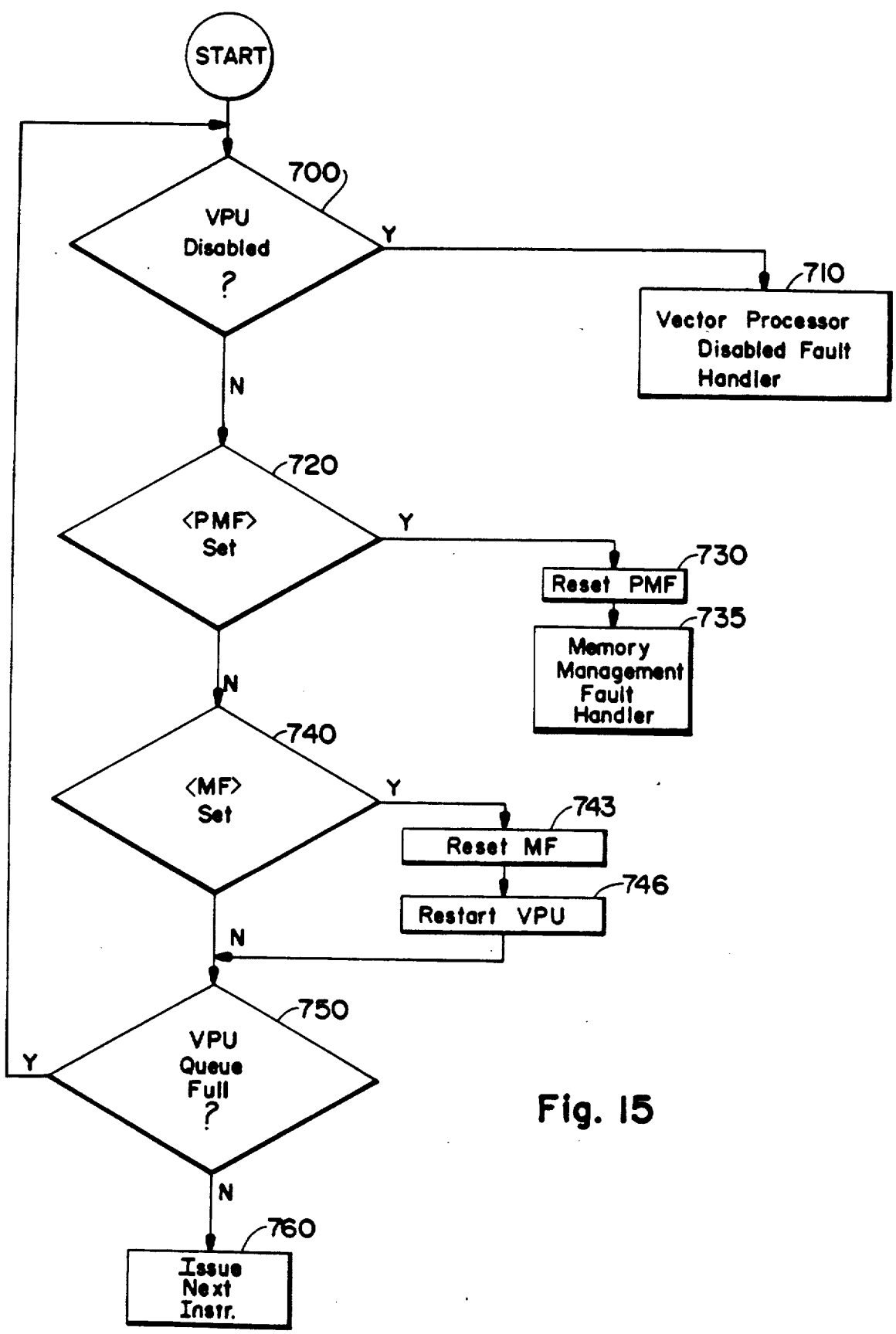
FIG. 15 is a flowchart depicting a preferred procedure to be performed by the data processing system shown in FIG. 1 when the vector processing unit of that system has experienced a memory management exception.

After VPU 30 is restarted, or if the MF bit 250 was not set, a VPU 30 instruction queue (not shown) is checked to see whether it is full (step 750). If so, then the procedure in FIG. 15 is reentered. If the VPU 30 queue is not full, then SPU 15 issues the next instruction (step 760), which is the pending vector instruction that initially triggered the memory management exception.

3. Arithmetic Exceptions

Unlike the situation with vector memory management exceptions, according to a preferred embodiment of the present invention, vector instructions which encounter vector arithmetic exceptions are always executed to completion. If an arithmetic exception occurs, either a default or truncated result is written into the corresponding vector register element. The arithmetic exception condition type and destination register number are recorded in exception condition summary field 320 of VAER 300. Mask unit 90 in VPU 30 then reads EXC bit 174 for the vector instruction to determine whether exceptions are enabled. As explained above, this bit enables floating underflow and integer overflow exceptions.

If EXC bit 174 is set for an instruction causing a floating underflow or integer overflow, VPU 30 sends a default reserved operand value for the floating point underflow or the low order bits for an integer overflow to the appropriate destination register element, clears VEN bit 210 of VPSR 200, and stores the appropriate arithmetic exception information in VAER 300. VPU 30 continues processing. VPU 30 follows the same procedure for floating overflow, floating divide by zero, and floating reserved operand arithmetic exceptions, which cannot be disabled.

The sixteen bits of the vector destination register mask 310 of VAER 300 indicate which of the sixteen vector registers have received a default value due to the occurrence of arithmetic exceptions. The types of arithmetic exceptions include floating underflow, floating-divide-by-zero, floating reserved operand, floating overflow and integer overflow. When a vector arithmetic exception occurs, VPU 30 disables itself. VPU 30 will complete the execution of the vector instruction causing the exception as well as any other instructions already in VPU 30, but will then refuse to accept subsequent vector instructions from SPU 15 until reenabled. VPU 30 is disabled by writing a zero to VEN bit 210 in VPSR 200.

If SPU 15 later attempts to send a vector instruction to VPU 30 when it is disabled, a Vector Processor Disabled Fault occurs.

4. Context Switching and Instruction Decoding

Memory management exceptions and arithmetic exceptions are most difficult to handle if VPU 30 and SPU 15 are executing instructions from alternately executing processes or programs. This condition occurs whenever there has been a context switch. In general, a great deal of system "overhead" is expended during context switching, and even slight savings may make a data processing system much more efficient.

Figure 16:
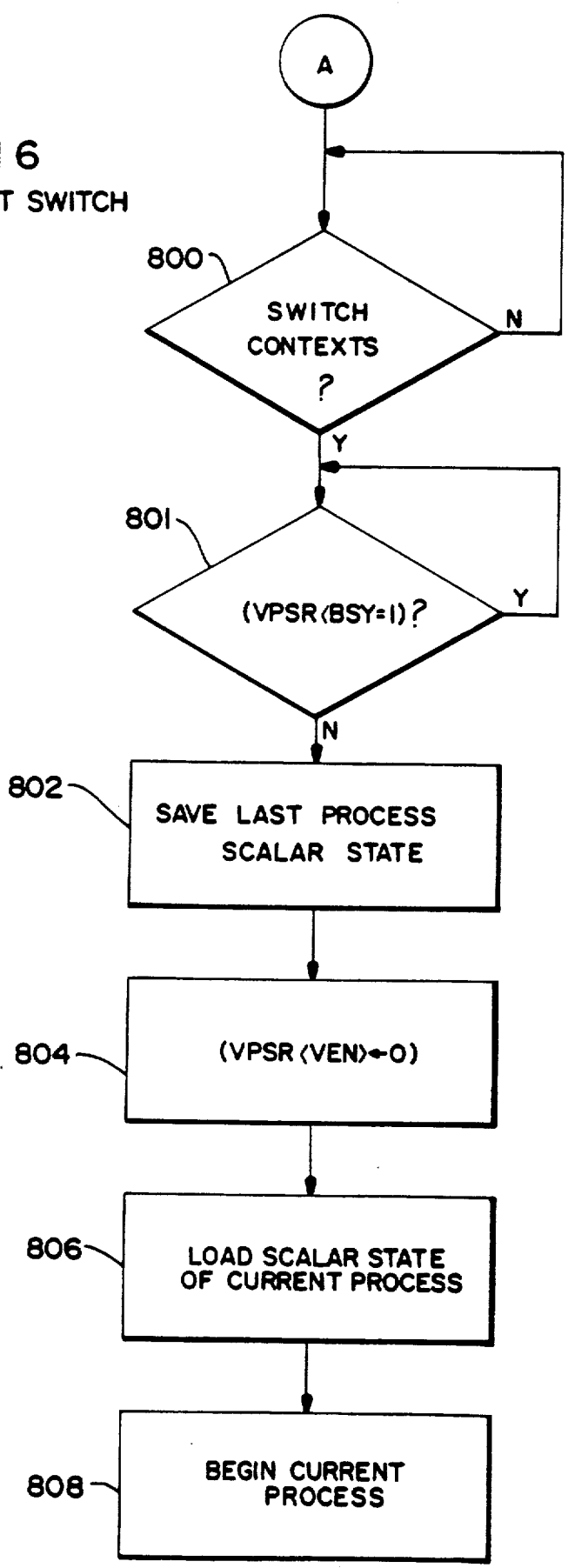
FIG. 16 is a flowchart depicting a preferred procedure to be performed by the data processing system of FIG. 1 during context switching.

FIG. 16 shows a flowchart of a preferred algorithm performed during a context switch as execution of one process, called the "last process," is halted and execution of a new process, called the "current process," is begun. Once a context switch occurs (step 800), SPU 15 waits until VPU 30 is not busy (step 801). A not busy state is indicated by BSY bit 290 of VPSR 200 having a value of zero. Once VPU 30 is not busy, SPU 15 saves only the scalar state information of the last process (step 802). That state information is saved by storing it into locations in memory processing unit 20 which correspond to the last process. SPU 15 contains its own process status register (see PSL 540 in FIG. 14) whose contents are saved as part of the step of saving the last SPU 15 state. During this step, the contents of all the registers in SPU 15 are also saved.

The state information of VPU 30 is not stored at this time. This delays, and may eliminate, the overhead caused when the state information of VPU 30 is stored. Storing the state information of VPU 30 would not only require storage of VPSR 200, VAER 300, VSAR 400, and the other system registers, but, more significantly, it would require the storage of the 16 vector registers, each with 64 elements, which would occupy a great deal of system resources.

Next, SPU 15 disables VPU 30 by clearing VEN bit 210 in VPSR 200 (step 804). Clearing VEN bit 210 prevents the current process from executing a vector instruction without incurring a Vector Processor Disabled Fault. In fact, as is explained in greater detail below, the state of VPU 30 for the last process need not be stored during execution of the current process if the current process does not execute a vector instruction.

Next, the scalar state information of the current process is loaded from locations in memory processing unit 20 corresponding to the current process (step 806), and the current process then begins execution (step 808). Because the vector state of the current process is not loaded during a context switch, VPU 30 contains the state information of the last process to execute a vector instruction. However, this state is inaccessible to the current process because VPU 30 is disabled.

Figure 17:
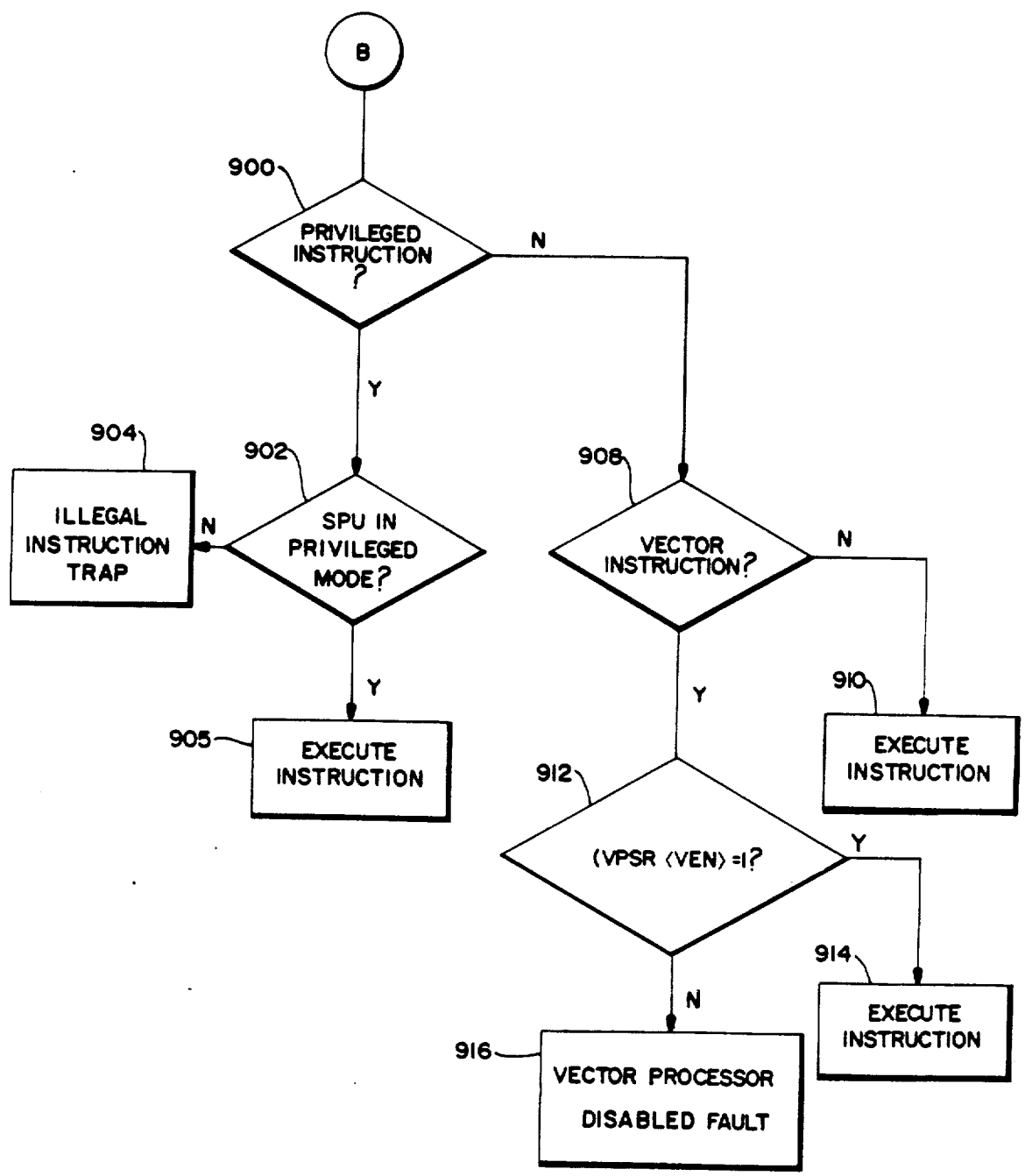
FIG. 17 is a flowchart depicting a preferred procedure to be performed for instruction decoding by the instruction decoder of FIG. 9.

FIG. 17 shows a flowchart of a preferred algorithm to be performed each time a process begins executing a new instruction. Preferably the steps shown in FIG. 17 are performed in SPU 15.

If the instruction is a privileged instruction (step 900) and SPU 15 is not in the privileged mode (step 902), an illegal instruction trap occurs (step 904) and the algorithm shown in FIG. 17 is completed. The procedure for handling the illegal instruction trap is common to almost every data processing system containing privileged instructions, and is well within the knowledge of a person of ordinary skill.

If the instruction is a privileged instruction (step 900) and SPU 15 is in the privileged mode (step 902), then the instruction is executed (step 905).

If the instruction is not a privileged instruction (step 900) and is not a vector instruction (step 908), SPU 15 executes the instruction (step 910). If, however, the instruction is a vector instruction (step 908), microcode in control logic unit 40 tests VEN bit 210 of VPSR 200 (step 912). If VEN bit 210 is set, indicating that VPU 30 is enabled, VPU 30 executes the instruction (step 914).

If VEN bit 210 is not set (step 912), then a Vector Processor Disabled Fault occurs (step 916). As explained above, VEN bit 210 is not set when the current process has not yet executed a vector instruction or if an arithmetic exception condition occurs. If the current process attempts to execute a vector instruction when VEN bit 210 is not set, the system must ensure that the vector state of the current process is switched into memory and that any exception conditions are processed before the vector instruction of the current process is executed.

Figure 18B:
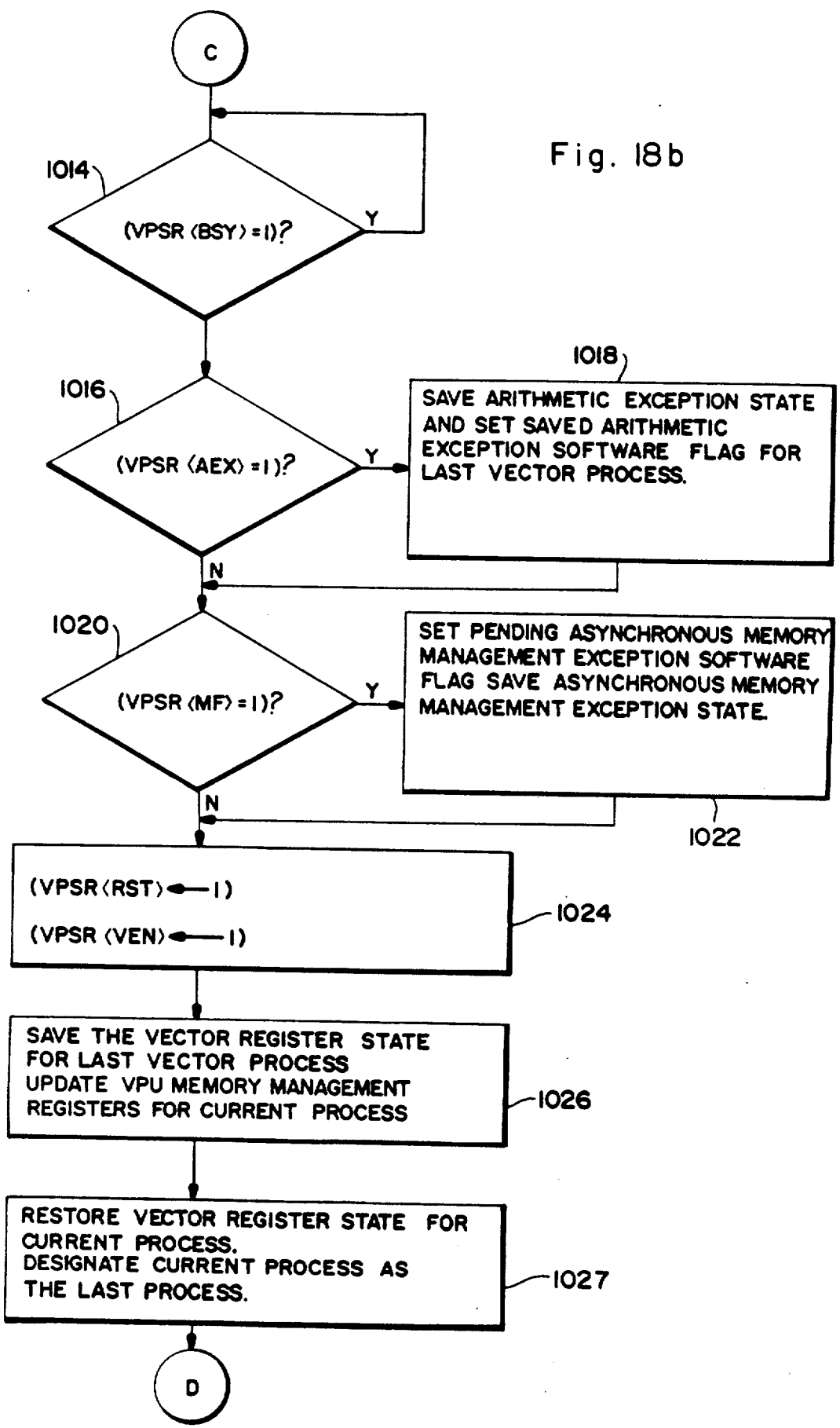
FIG. 18 is a flowchart depicting a preferred procedure to be performed by the data processing system in FIG. 1 in processing a Vector Processor Disabled Fault set in the procedure shown in FIG. 17.
Figure 18A:
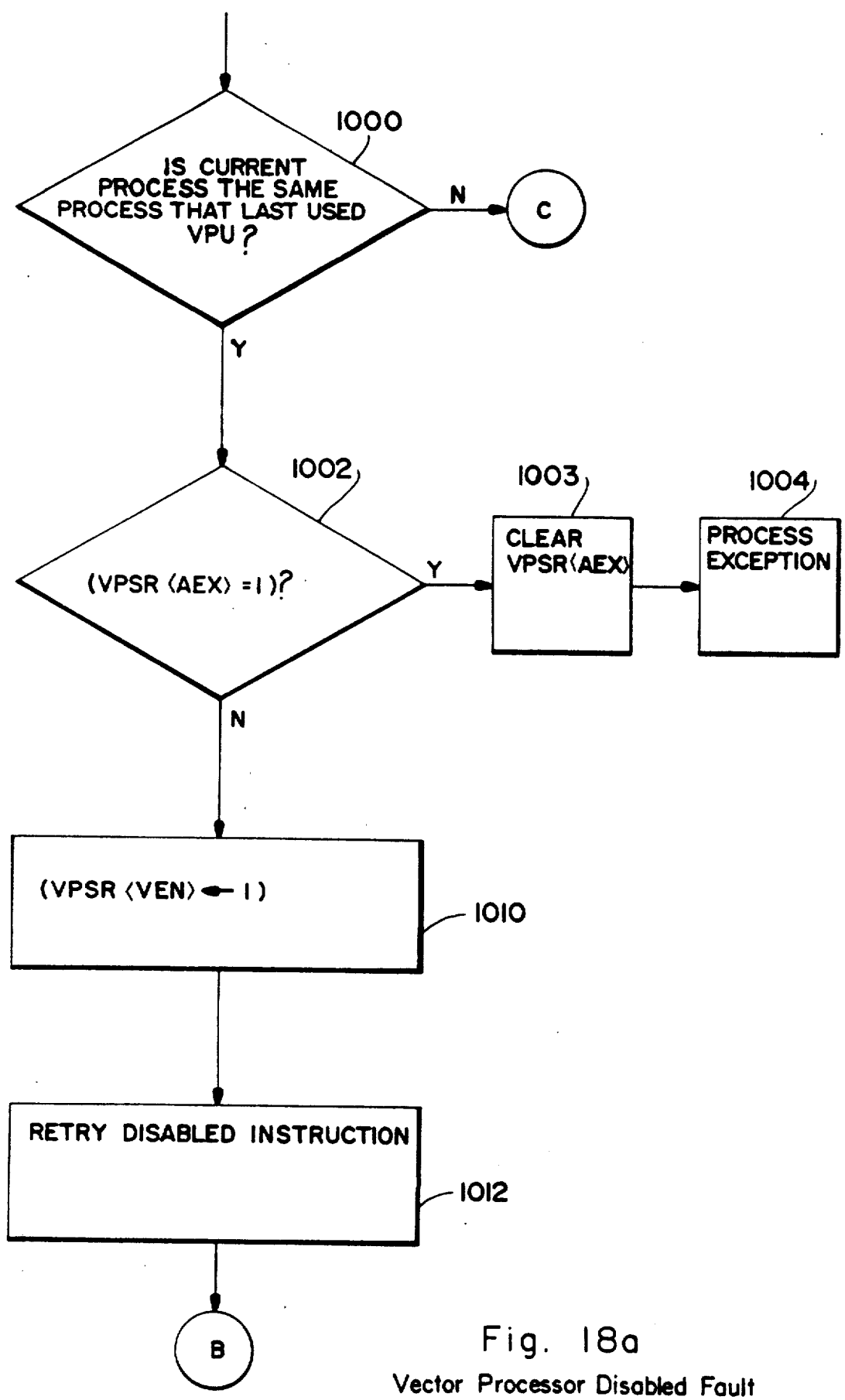
Figure 18C:
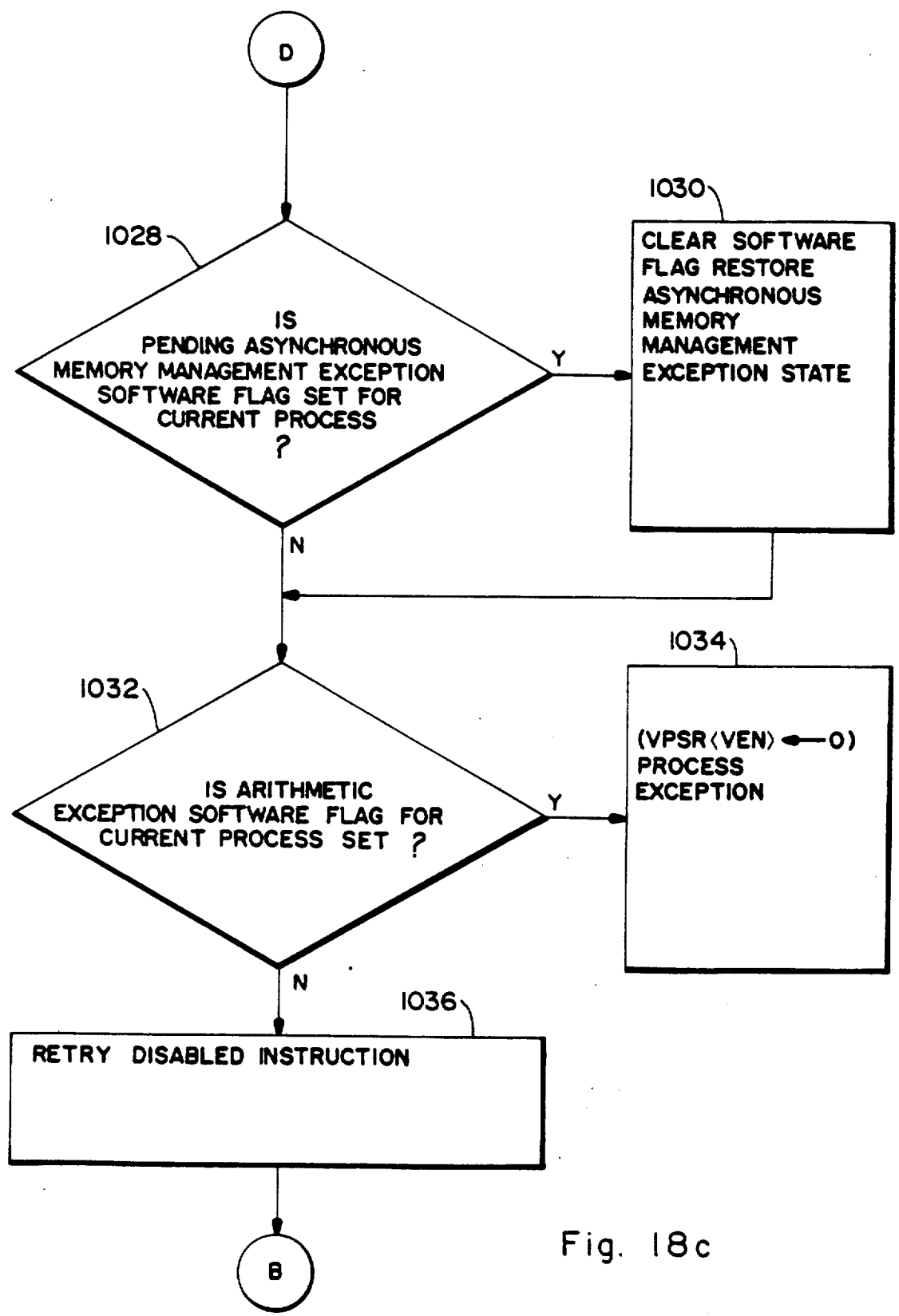

FIG. 18 shows a flowchart of a preferred algorithm to process a Vector Processor Disabled Fault, such as that shown in step 916 of FIG. 17. The purpose of this algorithm is threefold: (1) to process any vector exception conditions; (2) to store all VPU 30 state information from the process which last executed a vector instruction; and (3) to retrieve the VPU 30 state information for the current process. Items (2) and (3) are not necessary if the current process is the same as the process which last used VPU 30. Item (1) is necessary only when an exception condition is pending. It is possible, however, that items (1), (2), and (3) must all be completed before the currently executing process executes a vector instruction.

The first step in the Vector Processor Disabled Fault operation is to determine whether the current process is also the last process to have used VPU 30 to execute a vector instruction (step 1000). If the determination in step 1000 is "YES," it is unnecessary to update the state information for VPU 30. If the determination in step 1000 is "YES," then it is determined whether there are any pending arithmetic or memory management exception conditions (step 1002). As explained above, unlike prior art systems, data processing system 10 does not process the exceptions when they occur, but instead processes them when VPU 30 is used next. This may be the same time that VPU 30 saves its vector state information and retrieves the vector state information for the current process. The presence of exception conditions is determined by SPU 15's examination of PMF bit 260 (memory management exceptions) and AEX bit 270 (arithmetic exceptions) of VPSR 200.

If there is a pending arithmetic exception, then AEX bit 270 is cleared (step 1003) and the exception is processed (step 1004) in a manner appropriate to the exception in accordance with a procedure known to persons of ordinary skill in the data processing field. If there is no pending arithmetic exception condition (step 1002), it may be necessary to determine whether a context switch has occurred since the last Vector Processor Disabled Fault. Even when the current process is the same as the process which last used VPU 30 (step 1000) and, therefore, there is no need to save or restore VPU 30 vector state information, it may be necessary to update registers in VPU 30 which are affected by normal scalar processing. If, for example, VPU 30 contains copies of memory management registers located in SPU 15, the registers in VPU 30 would have to be updated after every context switch to ensure that their contents match the contents of the SPU 15 registers.

Next, VPU 30 is enabled by setting VEN bit 210 (step 1010). Control then returns to step B of the instruction decoding algorithm of FIG. 17 (step 1012) and the current process begins executing a new instruction.

If the current process is not the same as the process which last used VPU 30 (step 1000), then several steps occur. SPU 15 first waits until VPU 30 is not executing a vector instruction (step 1014). This "not busy" state is indicated by a zero value in BSY bit 290 of VPSR 200. Second, it is determined if any pending arithmetic exceptions exist (step 1016). If AEX bit 270 of VPSR 200 is set, indicating the presence of a pending arithmetic exception, the arithmetic exception state, as contained in VAER 300, is saved and the existence of an arithmetic exception for the last process to use VPU 30 is noted for later processing (step 1018). Notation of such an exception preferably is accomplished via a software flag associated with the last process to use VPU 30.

The next step is to determine if a pending asynchronous memory management exception exists (step 1020). Preferably, if such an exception exists, as indicated by a value of one in bit MF 250 of VPSR 200, a software flag associated with the last process to use VPU 30 is set and implementation specific vector information is saved for that process (step 1022).

Next, VPU 30 is enabled by setting VEN bit 210 of VPSR 200, and VPU 30 is reset by setting RST bit 200 of VPSR 300, (step 1024). Since the current process is not the same as the process which last used VPU 30 (step 1000), then the state information of VPU 30 must be updated. This is done in two steps. First, the state information in VPU 30 is stored into an area of memory processing unit 20 corresponding to the process which last used VPU 30 (step 1026). There may also be provided memory management registers in SPU 15 and corresponding memory management registers in VPU 30 to effect virtual addressing and memory protection functions. In this case, the memory management registers in VPU 30 may need to be updated to ensure that they match the corresponding memory management registers in SPU 15. Next, the state information for VPU 30 for the current process is retrieved from an area of memory processing unit 20 corresponding to the current process and is stored into the vector registers of VPU 30 (step 1027).

Next, a software flag associated with the current process is checked to determine if there is a pending asynchronous memory management exception for the current process (step 1028). If such a pending exception exists, the software flag for the current process is cleared and the vector state at the time of the asynchronous memory management exception is restored (step 1030). This is accomplished by writing the address of the saved vector state information to VSAR 400 and by setting RLD bit 240 and VEN bit 210 of VPSR 300, as discussed above in the section describing the registers of VPU 30.

Next a software flag associated with the current process is checked to determine if there is a pending arithmetic exception for the current process (step 1032). If such a pending exception exists, bit VEN 210 of VPSR 300 is cleared, disabling VPU 30, and the arithmetic exception is processed, similarly to step 1004, in a manner in accordance with a procedure known to persons of ordinary skill in the data processing field (step 1034).

When the Vector Processor Disabled Fault handling algorithm of FIG. 18 is complete (step 1036), control returns to step B of the instruction decoding algorithm of FIG. 17 and the current process begins executing a new instruction.

Context switching, which for vector processors can be a costly operation, is thus simplified significantly. The overhead accompanying such switching is delayed until it may no longer be necessary.

It will be apparent to those skilled in the art that various modifications and variations can be made in the data processing system and methods of the present invention and in the construction of this system without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims and their equivalents.

What is claimed is:

1. A data processing system capable of executing vector instructions and scalar instructions, said vector instructions involving data processing operations on vector quantities and said scalar instructions involving data processing operations on non-vector quantities, said data processing system comprising:
   scalar processing means for executing scalar instructions;
   vector processing means for executing vector instructions simultaneously with the execution of scalar instructions by said scalar processing means, said vector processing means including
      exception control means for disabling said vector processing means in response to an exception condition, and
      disablement indicating means, coupled to said exception control means, for indicating that the vector processing means is disabled;
   instruction decoding means, coupled to the scalar processing means and the vector processing means, for identifying and routing scalar instructions and vector instructions to said scalar processing means and said vector processing means, respectively; and
   control disabling means, coupled to said instruction decoding means and said disablement indicating means, for preventing said instruction decoding means from routing vector instructions to said vector processing means when said disablement indicating means indicates that said vector processing means is disable, and for allowing said instruction decoding means to continue routing instructions to said scalar processing means regardless of the state of said disablement indicating means,
   whereby said scalar processing means continues execution of said scalar instructions despite the occurrence of an exception condition in said vector processor means.

2. A data processing system according to claim 1, wherein said exception control means includes means for identifying arithmetic exceptions.

3. A data processing system according to claim 2, further comprising vector arithmetic exception processing means, coupled to said vector processing means, for processing vector arithmetic exceptions.

4. A data processing system according to claim 3, wherein said vector arithmetic means includes means for processing floating underflow exceptions.

5. A data processing system according to claim 3, wherein said vector arithmetic means includes means for processing floating-divide-by-zero exceptions.

6. A data processing system according to claim 3, wherein said vector arithmetic means includes means for processing floating reserved operand exceptions.

7. A data processing system according to claim 3, wherein said vector arithmetic means includes means for processing floating overflow exceptions.

8. A data processing system according to claim 3, wherein said vector arithmetic means includes means for processing integer overflow exception conditions.

9. A data processing system according to claim 2, wherein said exception control means includes exception selection means for identifying certain types of arithmetic exception conditions for which said exception control means will not disable said vector processing means.

10. A data processing system according to claim 9, wherein said includes exception selection means includes means for preventing said vector processing means from being disabled when said certain types of exception conditions occur.

11. A data processing system according to claim 10, wherein said exception selection means includes means for preventing said vector processing means from being disabled when a floating underflow exception condition occurs.

12. A data processing system according to claim 10, wherein said exception selection means includes means for preventing said vector processing means when an integer overflow exception condition occurs.

13. A data processing system according to claim 1, wherein said vector processing means includes
   vector storage means for storing vector processing state information indicative of an execution state of the vector processing means.

14. A data processing system according to claim 13, wherein said scalar processing means includes control logic means for examining vector processing information in said vector processing means.

15. A data processing system capable of executing vector instructions and scalar instructions, said vector instructions involving data processing operations on vector quantities and said scalar instructions involving data processing operations on non-vector quantities, said data processing system comprising:
   scalar processing means for executing scalar instructions;
   vector processing means, coupled to said scalar processing means, for executing vector instructions simultaneously with the execution of scalar instructions by said scalar processing means, said vector processing means including
exception control means for disabling said vector processing means in response to an exception condition, said exception control means including
means for identifying arithmetic exception conditions and memory management exception conditions, and
exception selection means for identifying certain types of arithmetic exception conditions for which said exception control means will not disable said vector processing means,
disablement indicating means, coupled to said exception control means, for indicating that the vector processing means is disabled,
vector arithmetic exception processing means for processing vector arithmetic exceptions, and
vector storage means for storing vector processing information indicative of an execution state of said vector processing means;
control logic means, coupled to said scalar processing means, for examining the vector processing information stored by said vector storage means;
instruction decoding means for identifying and routing vector instructions and scalar instructions to said scalar processing means and said vector processing means, respectively; and
control disabling means, coupled to said instruction decoding means and said disablement indicating means, for preventing said instruction decoding means from routing vector instructions to said vector processing means when said disablement indicating means indicates that said vector processing means is disabled, and for allowing said instruction decoding means to continue routing instructions to said scalar processing means regardless of the state of said disablement indicating means,
whereby said scalar processing means continues execution of said scalar instructions despite the occurrence of an exception condition in said vector processing means.

16. A method for processing vector instructions and scalar instructions by a data processing system, said vector instructions involving data processing operations on vector quantities and said scalar instructions involving data processing operations on non-vector quantities, said method comprising the steps of:
storing said vector instructions and said scalar instructions in a memory;
routing vector instructions and scalar instructions from the memory to a vector processor with a scalar processor, respectively;
executing scalar instructions in said scalar processor;
executing vector instructions in said vector processor simultaneously with the execution of scalar instructions in the absence of a disablement condition in said vector processor;
detecting the presence of an exception condition during the execution of said vector instructions;
placing the vector processor into said disablement condition when the presence of the exception condition is detected without interrupting execution of said scalar instructions in said scalar processor; and
indicating a vector processor disabled fault condition when said vector processor attempts to execute a vector instruction at the same time that said vector processor is disabled.

17. The data processing system of claim 13, wherein said vector storage means includes
a plurality of state registers containing the vector processing state information, and
wherein the disablement indicating means is contained in said state registers.

18. The data processing system of claim 1, wherein said control disabling means includes
means for determining whether said vector processing means is disabled due to a memory management exception condition, and
means for processing a trap procedure if said vector processing means is disabled for reasons other than a memory management exception condition.

19. The data processing system of claim 18, wherein said control disabling means includes
means for determining whether a memory management exception condition is pending in said vector processing means.

20. The data processing system of claim 18, wherein said control disabling means includes
means for determining whether a memory management exception condition for said vector processing means has been corrected, but the vector processing means has not resumed operation at the point where the memory management exception condition occurred.

21. The data processing system of claim 1, wherein said control disabling means is located in said scalar processing means.

22. The data processing system of claim 15, wherein said exception control means includes means for processing said exception conditions, and means for reenabling said vector processing means after
any pending exception conditions have been processed; and wherein said control disabling means includes
control reenabling means for allowing said instruction decoding means to resume routing vector instructions to said vector processing means after said vector processing means has been reenabled by said reenabling means.

23. The data processing system of claim 15, wherein said vector storage means includes a plurality of state registers, and
wherein said disablement indicating means includes a bit in one of said state registers.

24. The data processing system of claim 23, wherein said state registers include information about exception conditions for said vector processing means.

25. The data processing system of claim 15, wherein said control disabling means includes
means for determining whether said vector processing means is disabled due to a memory management exception condition, and
means for processing a trap procedure if said vector processing means is disabled for reasons other than a memory management exception condition.

26. The method of claim 16, further including the step of
preventing the routing of instructions to the vector processor when the vector processor is in the disablement condition.

27. The method of claim 26, further including the steps of
processing the detected exception condition,
removing the vector processor from the disablement condition after the exception condition has been processed, and
permitting the resumption of the routing of instructions to the vector processor when the vector processor has been removed from the disablement condition.

* * * * *